US009100241B2

(12) United States Patent
Zombek et al.

(10) Patent No.: US 9,100,241 B2
(45) Date of Patent: *Aug. 4, 2015

(54) SYSTEM AND METHOD FOR RE-DIRECTING REQUESTS FROM BROWSERS FOR COMMUNICATIONS OVER NON-IP BASED NETWORKS

(71) Applicant: TeleCommunication Systems, Inc., Annapolis, MD (US)

(72) Inventors: James M. Zombek, Boca Raton, FL (US); Donald J. Edwards, Reistertown, MD (US)

(73) Assignee: TeleCommunication Systems, Inc., Annapolis, MD (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/071,337

(22) Filed: Nov. 4, 2013

(65) Prior Publication Data
US 2014/0059122 A1 Feb. 27, 2014

Related U.S. Application Data

(63) Continuation of application No. 13/492,080, filed on Jun. 8, 2012, now Pat. No. 8,578,032, which is a continuation of application No. 12/659,737, filed on Mar. 19, 2010, now Pat. No. 8,200,829, which is a
(Continued)

(51) Int. Cl.
*G06F 15/16* (2006.01)
*H04L 29/06* (2006.01)
(Continued)

(52) U.S. Cl.
CPC ........ *H04L 29/06047* (2013.01); *H04L 1/1635* (2013.01); *H04L 29/06* (2013.01);
(Continued)

(58) Field of Classification Search
CPC ..... H04L 67/02; H04L 67/2814; H04L 29/06; H04L 29/06047
USPC ................. 709/201–203, 217–219, 227–230, 709/237–238, 250, 206–207; 370/464–467
See application file for complete search history.

(56) References Cited

U.S. PATENT DOCUMENTS 5,251,205 A 10/1993 Callon
5,446,736 A 8/1995 Gleeson
(Continued)

FOREIGN PATENT DOCUMENTS

EP 0959600 4/1999
IL WO98/44424 10/1998
JP 10307782 11/1998

OTHER PUBLICATIONS

Transmission Control Protocol, DARPA Internet Program Protocol Specification, RFC 793, Sep. 1981.
(Continued)

*Primary Examiner* — Bharat N Barot
(74) *Attorney, Agent, or Firm* — William H. Bollman

(57) ABSTRACT

A method and system for deploying content to client applications is provided. Inbound messages are accepted from a client application running on a client device via a proxy IP/port. The inbound messages are packaged into an internal message format with an HTTP redirector. The packaged message is forwarded to a back-end server via a message router. A response is received form from a web server. The response is packaged into the internal message format with the back-end server. The response is then forwarded to the HTTP redirector via a message router. The response can then be transferred to the client application running on the client device, via the proxy IP/port.

17 Claims, 18 Drawing Sheets

Related U.S. Application Data continuation of application No. 11/327,413, filed on Jan. 9, 2006, now Pat. No. 7,689,696, which is a continuation-in-part of application No. 09/494,553, filed on Jan. 31, 2000, now abandoned, which is a continuation-in-part of application No. 09/694,297, filed on Oct. 24, 2000, and a continuation-in-part of application No. 09/698,181, filed on Oct. 30, 2000, now Pat. No. 7,003,571.

(51) Int. Cl.
| | |
|---|---|
| *H04L 1/16* | (2006.01) |
| *H04L 12/26* | (2006.01) |
| *H04L 29/08* | (2006.01) |
| *H04L 12/24* | (2006.01) |
| *H04L 1/00* | (2006.01) |
| *H04W 80/00* | (2009.01) |

(52) U.S. Cl.
CPC ........ *H04L43/0817* (2013.01); *H04L 63/0407* (2013.01); *H04L 67/02* (2013.01); *H04L 67/025* (2013.01); *H04L 67/04* (2013.01); *H04L 67/10* (2013.01); *H04L 67/2814* (2013.01); *H04L 69/08* (2013.01); *H04L 69/16* (2013.01); *H04L 69/164* (2013.01); *H04L 69/329* (2013.01); *H04L 41/0213* (2013.01); *H04L 41/0681* (2013.01); *H04L 63/0281* (2013.01); *H04L 63/0428* (2013.01); *H04L 63/083* (2013.01); *H04L 67/2828* (2013.01); *H04L 67/2842* (2013.01); *H04L 69/18* (2013.01); *H04L 2001/0092* (2013.01); *H04W 80/00* (2013.01)

(56) References Cited

U.S. PATENT DOCUMENTS

| | | | |
|---|---|---|---|
| 5,511,122 A | 4/1996 | Atkinson | |
| 5,564,070 A | 10/1996 | Want | |
| 5,583,859 A | 12/1996 | Feldmeier | |
| 5,590,122 A | 12/1996 | Sandorfi | |
| 5,673,322 A | 9/1997 | Pepe | |
| 5,689,505 A | 11/1997 | Chiussi | |
| 5,742,592 A | 4/1998 | Scholefield | |
| 5,754,774 A | 5/1998 | Bittinger | |
| 5,771,353 A | 6/1998 | Eggleston | |
| 5,781,549 A | 7/1998 | Dai | |
| 5,825,752 A | 10/1998 | Fujimori | |
| 5,828,843 A | 10/1998 | Grimm et al. | |
| 5,850,517 A | 12/1998 | Verkler et al. | |
| 5,860,073 A | 1/1999 | Ferrel | |
| 5,862,345 A | 1/1999 | Okanoue | |
| 5,862,481 A | 1/1999 | Kulkarni | |
| 5,899,975 A | 5/1999 | Nielsen | |
| 5,949,799 A | 9/1999 | Grivna | |
| 5,970,059 A | 10/1999 | Ahopelto | |
| 6,026,430 A | 2/2000 | Butman | |
| 6,041,357 A | 3/2000 | Kunzelman | |
| 6,067,545 A | 5/2000 | Wolff | |
| 6,078,960 A | 6/2000 | Ballard | |
| 6,081,900 A | 6/2000 | Subramaniam | |
| 6,101,545 A | 8/2000 | Balcerowski | |
| 6,101,549 A | 8/2000 | Baugher | |
| 6,108,314 A | 8/2000 | Jones et al. | |
| 6,138,158 A | 10/2000 | Boyle | |
| 6,160,793 A | 12/2000 | Ghani | |
| 6,167,450 A | 12/2000 | Angwin et al. | |
| 6,185,625 B1 | 2/2001 | Tso et al. | |
| 6,192,029 B1 | 2/2001 | Averbuch | |
| 6,230,173 B1 | 5/2001 | Ferrel | |
| 6,233,577 B1 | 5/2001 | Ramasubramani | |
| 6,246,684 B1 | 6/2001 | Chapman | |
| 6,247,048 B1 | 6/2001 | Greer | |
| 6,252,884 B1 | 6/2001 | Hunter | |
| 6,272,129 B1 | 8/2001 | Dynarski et al. | |
| 6,304,564 B1 | 10/2001 | Monin | |
| 6,310,892 B1 | 10/2001 | Olkin | |
| 6,311,215 B1 | 10/2001 | Bakshi et al. | |
| 6,331,983 B1 | 12/2001 | Haggerty et al. | |
| 6,343,318 B1 | 1/2002 | Hawkins et al. | |
| 6,374,305 B1 | 4/2002 | Gupta | |
| 6,389,465 B1 | 5/2002 | Peterson et al. | |
| 6,393,014 B1 | 5/2002 | Daly et al. | |
| 6,397,259 B1 | 5/2002 | Lincke et al. | |
| 6,405,236 B1 | 6/2002 | Nieratschker | |
| 6,418,128 B1 | 7/2002 | Takagi | |
| 6,421,733 B1 | 7/2002 | Tso et al. | |
| 6,430,624 B1 | 8/2002 | Jamtgaard | |
| 6,445,691 B2 | 9/2002 | Sato | |
| 6,452,910 B1 | 9/2002 | Vij et al. | |
| 6,473,411 B1 | 10/2002 | Kumaki et al. | |
| 6,473,609 B1 | 10/2002 | Schwartz et al. | |
| 6,477,543 B1 | 11/2002 | Huang et al. | |
| 6,477,577 B1 | 11/2002 | Asano | |
| 6,490,266 B1 | 12/2002 | Kim | |
| 6,490,617 B1 | 12/2002 | Hemphill et al. | |
| 6,505,248 B1 | 1/2003 | Casper et al. | |
| 6,507,589 B1 | 1/2003 | Ramasubramani | |
| 6,510,464 B1 | 1/2003 | Grantges et al. | |
| 6,512,754 B2 | 1/2003 | Feder et al. | |
| 6,529,722 B1 | 3/2003 | Heinrich | |
| 6,529,882 B1 | 3/2003 | Park et al. | |
| 6,539,019 B1 | 3/2003 | Noy et al. | |
| 6,539,422 B1 | 3/2003 | Hunt et al. | |
| 6,542,993 B1 | 4/2003 | Erfani | |
| 6,563,919 B1 | 5/2003 | Aravamudhan | |
| 6,567,857 B1 | 5/2003 | Gupta et al. | |
| 6,578,066 B1 | 6/2003 | Logan et al. | |
| 6,590,588 B2 | 7/2003 | Lincke et al. | |
| 6,590,885 B1 | 7/2003 | Jorgensen | |
| 6,600,735 B1 | 7/2003 | Iwama | |
| 6,601,108 B1 | 7/2003 | Marmor | |
| 6,628,965 B1 | 9/2003 | LaRossa | |
| 6,631,402 B1 * | 10/2003 | Devine et al. ................. 709/217 |
| 6,633,910 B1 | 10/2003 | Rajan et al. | |
| 6,640,248 B1 | 10/2003 | Jorgensen | |
| 6,640,302 B1 | 10/2003 | Subramaniam | |
| 6,647,264 B1 | 11/2003 | Sasamoto | |
| 6,665,711 B1 | 12/2003 | Boyle | |
| 6,665,718 B1 | 12/2003 | Chuah et al. | |
| 6,675,208 B1 | 1/2004 | Rai et al. | |
| 6,681,262 B1 | 1/2004 | Rimmer | |
| 6,691,165 B1 | 2/2004 | Bruck et al. | |
| 6,701,374 B2 | 3/2004 | Gupta et al. | |
| 6,718,384 B2 | 4/2004 | Linzy | |
| 6,721,779 B1 | 4/2004 | Maffeis | |
| 6,721,872 B1 | 4/2004 | Dunlop | |
| 6,735,631 B1 | 5/2004 | Oehrke | |
| 6,744,764 B1 | 6/2004 | Biddeliazari | |
| 6,771,742 B2 | 8/2004 | McCalmont | |
| 6,772,195 B1 | 8/2004 | Hatlelid et al. | |
| 6,778,099 B1 | 8/2004 | Meyer | |
| 6,785,261 B1 | 8/2004 | Schuster | |
| 6,826,173 B1 | 11/2004 | Kung | |
| 6,857,013 B2 | 2/2005 | Ramberg et al. | |
| 6,862,622 B2 | 3/2005 | Jorgensen | |
| 6,874,018 B2 | 3/2005 | Wu | |
| 6,879,582 B1 | 4/2005 | Dhara et al. | |
| 6,894,988 B1 | 5/2005 | Zehavi | |
| 6,925,307 B1 | 8/2005 | Mamdani | |
| 6,954,751 B2 | 10/2005 | Christfort | |
| 7,003,571 B1 | 2/2006 | Zombek | |
| 7,016,360 B1 | 3/2006 | Dong | |
| 7,047,300 B1 | 5/2006 | Oehrke | |
| 7,062,556 B1 | 6/2006 | Chen | |
| 7,133,403 B1 | 11/2006 | Mo | |
| 7,689,696 B2 * | 3/2010 | Zombek et al. ................. 709/227 |
| 7,711,094 B1 | 5/2010 | Olshansky | |
| 7,818,664 B2 | 10/2010 | Gordon | |
| 7,873,734 B1 | 1/2011 | Eidelman | |
| 8,200,829 B2 | 6/2012 | Zombek | |
| 2001/0034791 A1 * | 10/2001 | Clubb et al. ................. 709/238 |

(56) References Cited

U.S. PATENT DOCUMENTS

| | | |
|---|---|---|
| 2001/0056354 A1 | 12/2001 | Feit |
| 2002/0002602 A1 | 1/2002 | Vange |
| 2002/0049790 A1 | 4/2002 | Ricker |
| 2002/0133598 A1 | 9/2002 | Strahm |
| 2003/0158897 A1 | 8/2003 | Ben-Natan |
| 2003/0182431 A1 | 9/2003 | Sturniolo |
| 2004/0059797 A1 | 3/2004 | Velan |
| 2005/0021595 A1 | 1/2005 | Wesinger |
| 2005/0213716 A1 | 9/2005 | Zhu |
| 2006/0072547 A1 | 4/2006 | Florkey |
| 2007/0266176 A1 | 11/2007 | Wu |
| 2008/0063153 A1 | 3/2008 | Krivorot |
| 2008/0101552 A1 | 5/2008 | Khan |
| 2008/0178072 A1 | 7/2008 | Fiedorowicz |
| 2008/0200143 A1 | 8/2008 | Qiu |
| 2008/0288577 A1 | 11/2008 | Clubb |
| 2009/0003312 A1 | 1/2009 | Velazquez |
| 2009/0103687 A1 | 4/2009 | Peters |
| 2010/0268773 A1 | 10/2010 | Hunt |
| 2011/0128972 A1 | 6/2011 | Thornton |

OTHER PUBLICATIONS

U.S. Appl. No. 60/041,623, filed Mar. 1997.

Dolgicer, Max, Messaging Middleware: The Next Generation, Data Communications, Jul. 1994, pp. 1-8.

International Search report in PCT/US00/35478 dated Oct. 24, 2001.

Patent Abstracts of Japan Publication No. 10233820, publication date Sep. 2, 1998.

Aether Technologies; "AIM.net Architecture"; Version 1.1; Apr. 12, 1999; pp. 1-75.

Joe, Inwhee; A new AAL Protocol for Time-Critical UDP Traffic over Wireless ATM Networks IEEE 1999.

* cited by examiner

SYSTEM AND METHOD FOR RE-DIRECTING REQUESTS FROM BROWSERS FOR COMMUNICATIONS OVER NON-IP BASED NETWORKS

CROSS-REFERENCE TO RELATED PATENT APPLICATION

The present application is a continuation application of U.S. patent application Ser. No. 13/492,080 entitled "System and Method for Re-Directing Requests from Browsers for Communication Over Non-IP Based Networks" to Zombek et al., filed on Jun. 8, 2012, now U.S. Pat. No. 8,578,032, which is a continuation application of U.S. patent application Ser. No. 12/659,737 entitled "System and Method for Re-Directing Requests from Browsers for Communication Over Non-IP Based Networks" to Zombek et al., filed on Mar. 19, 2010, now U.S. Pat. No. 8,200,829, which is a continuation application of U.S. patent application Ser. No. 11/327,413 entitled "System and Method for Re-Directing Requests from Browsers for Communication Over Non-IP Based Networks" to Zombek et al. filed on Jan. 9, 2006, now U.S. Pat. No. 7,689,696, which is a continuation-in-part application of U.S. patent application Ser. No. 09/494,553, entitled "A Messaging Method and Apparatus for Sending and Receiving Messages in a Client Server Environment Over Multiple Wireless Networks," to Zombek, et al., filed on Jan. 31, 2000, which is a continuation-in-part application of U.S. patent application Ser. No. 09/694,297, entitled "A Messaging Method and Apparatus for Sending and Receiving Messages in a Client Server Environment Over Multiple Wireless Networks, " to Zombek, et al., filed on Oct. 24, 2000, and a continuation-in-part application of U.S. patent application Ser. No. 09/698,181, entitled "A System and Method for Re-Directing Request from Browsers for Communication Over Non-IP Based Networks," to Zombek, et al., filed on Oct. 30, 2000, now U.S. Pat. No. 7,003,571, of common assignee to the present invention, the contents of all of which are incorporated herein by reference in their entireties.

FIELD OF THE INVENTION

The present invention relates in general to the field of communications and more particularly to messaging between client devices and servers over multiple wireless networks that use different access protocols.

BACKGROUND OF THE INVENTION

Recent advances in hardware and communication technologies have brought about an era of client computing over wired and wireless networks. The proliferation of powerful notebook computers and wireless client devices promises to provide client end users with network access at any time and in any location over various networks, including the Internet. This continuous connectivity allows users to be quickly notified of changing events, and provides them with the resources necessary to respond in realtime even when in transit. For example, in the financial services industry, online traders and financial professionals may be given the power to access information in real-time, using wireless client devices.

Conventionally, however, developers of complex, wireless messaging solutions have been forced to develop applications that are specific to various device types and network access protocols in diverse enterprise architectures and platforms. In other words, conventional client computing solutions have been largely platform-specific, network-specific, or both. For example, messages may be generated by a wide variety of applications running on a wide variety of client devices, such as Palm computing platform devices, Windows CE devices, paging and messaging devices, laptop computers, data-capable smart phones, etc. Depending on the type of network used by service providers, the client-generated messages may be transported over networks having various access protocols, such as, e.g., Cellular Digital Packet Data (CDPD), Mobitex, dial-up Internet connections, Code Division Multiple Access (CDMA), Global System for Mobile Communications (GSM), and ReFlex. As a result, current developers of client computing solutions must have intimate knowledge of specific network characteristics including, e.g., wireless network characteristics, protocol environments, and wireless links channel characteristics. Therefore, there exists a need to simplify wireless client and server application development environments to support the wide variety of device and network dependent architectures.

Messaging Application Programming Interface (MAPI) is a messaging architecture and an interface component for applications such as electronic mail, scheduling, calendaring and document management. As a messaging architecture, MAPI provides a consistent interface for multiple application programs to interact with multiple messaging systems across a variety of hardware platforms. MAPI provides cross platform support through such industry standards as Simple Mail Transfer Protocol (SMTP), X.400 and common messaging calls. MAPI is also the messaging component of Windows Open Services Architecture (WOSA).

Accordingly, MAPI is built into such operating systems as, e.g., Windows 95, Windows 98, Windows NT and Windows 2000, available from Microsoft Corporation of Redmond, Wash., U.S.A. and can be used by 16-bit and 32-bit Windows applications. For example, a word processor can send documents and a workgroup application can share and store different types of data using MAPI. MAPI separates the programming interfaces used by the client applications and the service providers. Every component works with a common, Microsoft Windows-based user interface. For example, a single messaging client application can be used to receive messages from fax, a bulletin board system, a host-based messaging system and a LAN-based system. Messages from all of these systems can be delivered to a single "universal inbox."

Transmission Control Protocol (TCP) is a transport layer protocol used by an application in one host to communicate with an application in another host. This is accomplished by services provided by the protocol layers beneath the transport layer in both hosts. As a connection-oriented protocol TCP requires the establishment of a connection between the two hosts before two applications are able to communicate. TCP manages the connection and once both applications have communicated all required information between themselves the connection is released as if the connection is two simplex connections as opposed to a single duplex connection. The information is transferred between applications on different hosts is a byte stream. The transport layer hides message transfer details such as segmentation, ordering and duplication from the applications and provides end-to-end acknowledgement.

The Internet Protocol (IP) layer provides certain services to the transport layer protocol including hiding the details of the physical and data link layers and the services provided by them from the transport layer protocol. The IP layer provides a datagram delivery service. A datagram is a unit of data less than an entire message. A message may be, for example, a file, which may be quite large. Since there is a maximum size for a message (or file), the message may have to be segmented and transferred in smaller units. These smaller units are thus called datagrams. Each datagram is sent over the network as a separate entity and may, in fact, follow separate paths to the destination host. At the destination host, the datagrams are reassembled in proper order (usually in a buffer area) by the transport layer. Each node on the network sends any datagrams on to a next node only considering the final destination and only acknowledges receipt of the datagram to the preceding node. That is, the IP layer does not provide end-to-end acknowledgement. End-to-end acknowledgement is a service of the transport layer protocol. Should any node-to-node acknowledgements not be received by the preceding node, the datagram or datagrams unacknowledged will be retransmitted. The transport layer in the destination host will also acknowledge any duplicated datagrams (else receipt of duplicate datagrams will continue resulting in a clogged network) and ignore them.

Routing between network nodes is accomplished by means of muting tables. These routing tables can be static or dynamic and result in datagrams being forwarded from a source host to a destination host one node at a time. The intermediate nodes are often called "hops."

The acronym, TCP/IP, is also used to refer to a five layer protocol model similar to the ISO/OSI seven layer protocol model. The TCP/IP model does not have the equivalent to layers 5 and 6 of the ISO/OSI protocol model. A protocol model defines the protocol layers and the interfaces between the layers. When implemented in software, hardware or firmware or possibly field programmable gate arrays (FPGAs), the implementation provides the actual services. This layered approach allows for ease of upgrading so long as the interface to the layer immediately above or below is not altered.

Layering also allows for complete substitution. For example, should a new physical medium become available then so long as the interface between layer two and layer one remain the same, an old physical layer implementation module can be removed and a new implementation module substituted. In the alternative, the new implementation module could be added as another option. That is, the protocol suite defines the rules and the implementation provides the services that allow the communications to take place between applications on different hosts. The implementation of the TCP layer provides for the application to require a certain Quality of Service (QOS) as specified by a set of parameters including but not limited to priority, transmission delay, throughput etc.

Another well-known transport layer protocol is known as User Datagram Protocol (UDP), which is a connectionless transport protocol. The basic data transfer unit is the datagram. A datagram is divided into header and data areas as it is for the IP layer. An additional header over and above the IP header is used. The UDP header contains source and destination addresses (ports), a UDP length field (the length includes the 8 byte header and the data) and a UDP checksum. The UDP data includes the IP header and data. The IP layer supports UDP as a connectionless transport protocol for use in transmitting, for example, one time request-reply type messages or applications where time is of greater importance than accuracy.

TCP is used by applications on different hosts to communicate over an assumed unreliable network. To accomplish such communication much is added to the protocol in order to ensure that the information transferred over the network is valid. This addition has a cost and that cost is increased overhead with the attendant increase in bandwidth. A UDP header is eight bytes, the TCP header is 24 bytes and an IP header is a minimum of 20 bytes. Therefore, UDP/IP headers are a minimum of 28 bytes and TCP/IP headers are a minimum of 44 bytes. This is fairly large in terms of overhead and bandwidth utilization particularly over wireless networks. There are other significant problems with using standard TCP/IP over wireless networks principally in the area of flow control. The UDP/IP protocol combination, while not offering any guarantees to users, is expected to be reliable. Wireless networks tend, however, by their nature to be lossy. Several solutions have been proposed when the network is not homogeneous. That is, when the network has both wireless and wireline portions. One suggestion is to use indirect TCP and another is to use snooping.

Other protocols such as Serial Line IP (SLIP) and Point to Point Protocol (PPP) have been developed. SLIP is not a standard and both are for point to point connections only so are not available for uses in networks. CDPD vendors indicate that they provide an integrated TCP/IP stack but it is not known the cost in terms of bandwidth overhead.

Conventionally, the existing wireless protocols do not provide an end-to-end solution over multiple networks and multiple client devices. Therefore, in addition to the need for a common architecture through a single, user friendly methodology for providing effective and reliable wireless data solutions for hand-held and laptop computing devices, wireless networks, and legacy systems, there also exists a need to efficiently and reliably communicate data using minimum bandwidth.

SUMMARY OF THE INVENTION

The present invention features a system, method and computer program product that in an exemplary embodiment is operative to provide a multi-network transport programming interface that can enable client/server applications to be written easily, where such applications can allow client applications running on client devices to communicate messages with server applications across one or more wireless and wire-line networks. Moreover, the present invention in an exemplary embodiment offers features for communicating such messages over wireless networks efficiently, without requiring significant bandwidth, a valuable resource in wireless networks.

Briefly, the present invention in an exemplary embodiment includes a system for communicating messages in a client-server environment over one or more wireless networks that can support different network protocols. In an exemplary embodiment, the system of the invention includes a client device operative to execute a client application, and a back-end server (BES) operative to execute a server application. In an exemplary embodiment, a protocol gateway (PG) can encapsulate an underlying network protocol of the plurality of wireless networks. In an exemplary embodiment, a client application and the server application can communicate messages with each other through the PG independently of the underlying network protocol of the wireless network used for such communication.

Conventional session-based transport protocols (e.g. TCP) are designed for LAN-based systems with little network latency. These session-based transport protocol implementations are extremely chatty and were not designed to consider the amount of bytes sent over the network to maintain the state of a connection.

Advantageously, the present invention, in an exemplary embodiment, features a highly optimized semi-reliable data transport protocol, simple network transport layer (SNTL). The transport protocol implementation, in an exemplary embodiment, can optimize the over the air communication by using a connectionless send and receive mechanism. In addition, or alternatively, in an exemplary embodiment, the present invention can provide multiple compression mechanisms to reduce the amount of information that needs to be sent over the air. In an exemplary embodiment, in order to provide a reliable mechanism over a connectionless environment, the transport protocol implementation can provide for message segmentation and reassembly, message retries, or message ACK and NACK service for each supported wireless network. In an exemplary embodiment, message segments that are not acknowledged by the peer protocol layer within the configurable time frame can be retried automatically by the transport protocol implementation. In order to facilitate the request and provision of services, the interfaces between layers can be clearly defined for peer-to-peer communication between corresponding layers of both sides of a connection. That is, the protocol stack on each side (client and server) can be symmetrical. This can allow two machines to specify how they communicate with one another on a level-to-level basis, rather than having to negotiate one giant protocol for the entire network. This means that logical communications can occur at the peer protocol layer. On the client side for wireless communications this can be called a peer wireless protocol layer. In an exemplary embodiment, the client or server applications do not need to be concerned with segmenting the message and performing message reties. In addition to performing message retries, the transport protocol implementation can support message duplication detection. In an exemplary embodiment, to support this reliable mechanism over a connectionless environment, the transport protocol implementation can add only four to six bytes to each application message. In an exemplary embodiment, SNTL can include a novel and non-obvious hybrid protocol including many of the advantages of TCP but connectionless as is UDP. Further, in an exemplary embodiment, there can be less overhead than is required by conventional TCP.

The present invention, in an exemplary embodiment, can also use a wireless connectivity middle layer gateway, which can be developed using a wireless software development environment. The environment can insulate a developer from the complexities of the underlying details related to devices and protocols.

In an exemplary embodiment, the environment can be packaged, advantageously, as a software development toolkit (SDK). The developer can work at the application layer by using the SDK. The SDK, in an exemplary embodiment, can include, e.g., software libraries for client and/or server application development. The present invention, in an exemplary embodiment, can support solutions and software engineering using technologies such as, e.g., Windows NT/95/98/2000, Open Database Connection (ODBC) compliant databases, Palm OS, and Windows CE client devices, and CDPD, Mobitex and dial-up networks.

Advantageously, wireless technologies and client devices can remain transparent to the data source through the use of client and server application programming interfaces (APIs) that can support multiple operating environments including, for example, Palm OS, RIM, Windows 95, 98, 2000, CE and NT, UNIX, Linux, and other variations of UNIX, etc. These well-defined APIs can use a set of portable class libraries to aid in rapid application development. Access to the intelligent messaging network of the present invention can be via wireless client devices or via a dial-up or leased line or other wireline connection coupled via, e.g., an Internet service provider (ISP), a network service provider (NSP), a private network, or a virtual private network (VPN). That is, enterprise support, can be provided for and to, wireless clients and clients that need to access the intelligent messaging network of the present invention via a wired connection or dial-up line. This latter group of clients can be called Internet proxy clients, i.e., clients that can use a proxy server for access to the Internet. As client devices and wireless network technologies evolve, this system can ensure that data solutions are supported.

In an exemplary embodiment, a method and system for deploying content to client applications is provided. Inbound messages are accepted from a client application running on a client device via a proxy IP/port. The inbound messages are packaged into an internal message format with an HTTP redirector. The packaged message is forwarded to a back-end server via a message router. A response is received form from a web server. The response is packaged into the internal message format with the back-end server. The response is then forwarded to the HTTP redirector via a message router. The response can then be transferred to the client application running on the client device, via the proxy IP/port.

In another embodiment, a wireless device for communicating with a server via a wireless network is provided. The wireless device can include a browser generating a request. A redirector can receive the request via a proxy IP/port. The redirector may then package the request with a protocol used by the wireless network.

The request may be fulfilled by the wireless network and transmitted to the wireless device. In one embodiment, the request may be an HTTP request. The HTTP request can be sent from a proxy server to an appropriate web server. A response is received to the request. The response may then be packaged into a message format used by the wireless network. The packaged response is sent to a redirector. The packaged response can be unpacked with the redirector and provided the to a web browser.

In another exemplary embodiment, a method of deploying content from one of a plurality of servers, through a message router and over a wireless network to a client application, which is running on one or more of a plurality of client devices, is provided. An inbound message can be created with a redirector at the client device. The inbound message may include a message key. The inbound message can be sent from the client device and accepted at the message router. The inbound message may be forwarded to a selected one of the plurality of servers based on the message key.

A further embodiment includes a messaging system. The messaging system may comprise. A client device having a web browser and a redirector communicating with the web browse. The redirector can package messages from the web browser in a fundamental network protocol. A plurality of wireless networks, each of which is adapted to communicate messages between the client device and a server and support one or more wireless network protocols, may be provided. A protocol gateway can encapsulate the fundamental network protocol, which underlies each of the one or more wireless network protocols. Also, means for communicating messages between the web browser and the server, over a selected wireless network protocol through the protocol gateway, independent of the selected wireless network protocol should be included.

A computer useable information storage medium storing computer readable program code may be provided to carry out the method. For example, an embodiment of the invention may include a computer useable information storage medium storing computer readable program code for causing a computer to perform the steps of:

accepting inbound messages from a client application running on a client device;

packaging the inbound messages into an internal message format with a redirector;

forwarding the packaged message to a back-end server, receiving a response from a web server;

packaging the response into the internal message format with the back-end server, forwarding the response to the redirector, and transferring the response to the client application running on the client device.

Further features and advantages of the invention, as well as the structure and operation of various exemplary embodiments of the invention, are described in detail below with reference to the accompanying drawings. In the drawings, like reference numbers generally indicate identical, functionally similar, and/or structurally similar elements. The drawing in which an element first appears is indicated by the leftmost digits in the corresponding reference number.

BRIEF DESCRIPTION OF THE DRAWINGS

The foregoing and other features and advantages of the invention will be apparent from the following, more particular description of an exemplary embodiment of the invention, as illustrated in the accompanying drawings.

DETAILED DESCRIPTION OF AN EXEMPLARY EMBODIMENT OF THE INVENTION

A preferred embodiment of the invention is discussed in detail below. While specific implementations are discussed, it should be understood that this is done for illustration purposes only. A person skilled in the relevant art will recognize that other components and configurations may be used without parting from the spirit and scope of the invention.

Figure 1A:
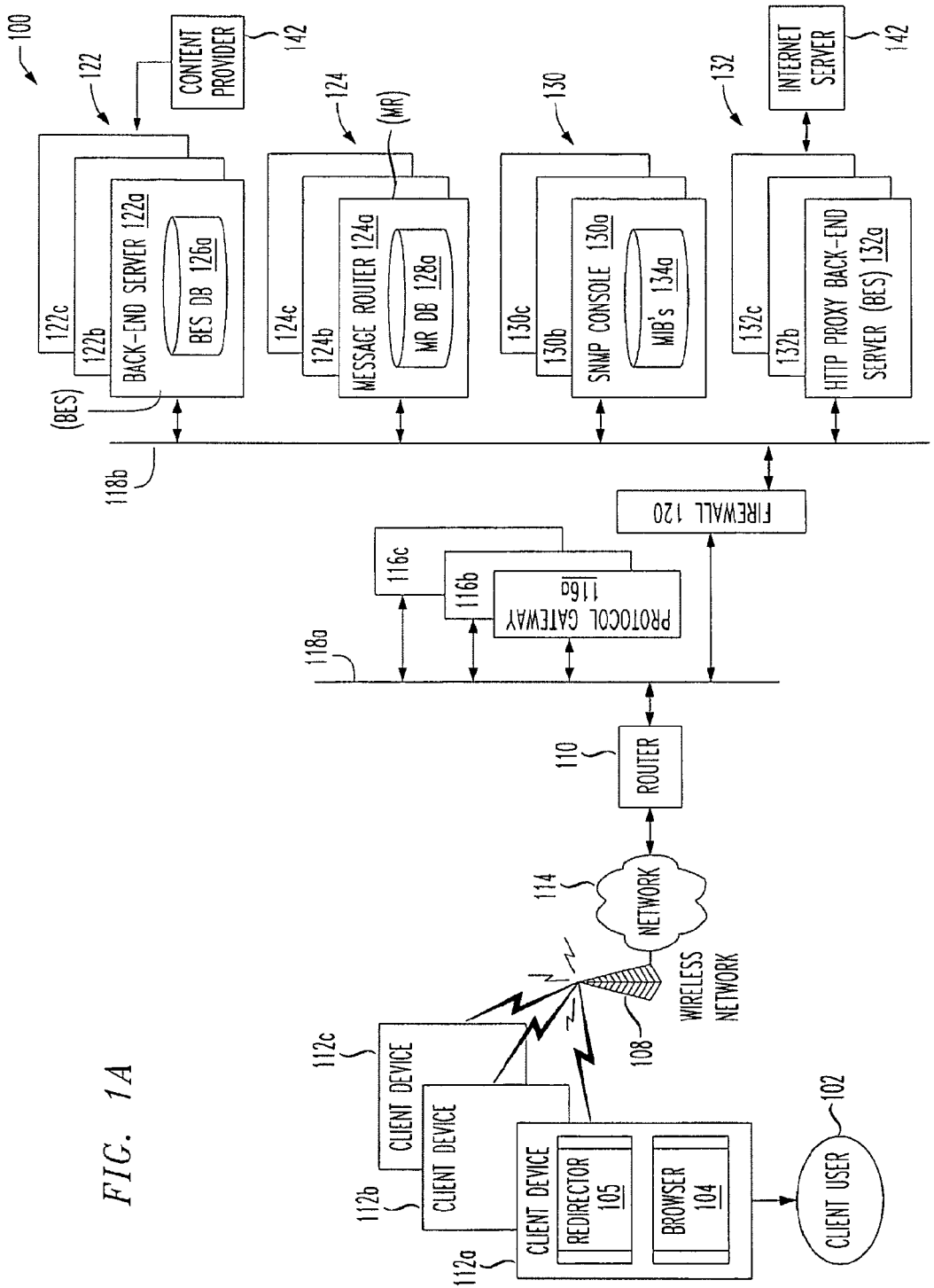
FIG. 1A is a block diagram of an exemplary embodiment of a communication system that advantageously incorporates a messaging system according to the present invention.

FIG. 1A depicts a block diagram of a communication system 100 that advantageously can incorporate the present invention including one or more client devices 112*a-c*, collectively referred to as client devices 112. The client devices 112 can execute corresponding client applications, which can be developed to provide specific subscriber solutions. For example, service subscribers such as, e.g., client user 102, as shown, can carry, e.g., Palm Pilot client devices, Windows CE based client devices or other one-way or two-way messaging client devices 112 to, e.g., remain apprised of stock market activities and initiate transactions while roaming within the coverage area of their respective wireless service providers.

As described in detail below, the communication system 100 can support an intelligent messaging network architecture (hereafter referred to as "intelligent messaging network") according to the present invention. The intelligent messaging network advantageously can incorporate a middleware service in accordance with the present invention that can allow for the development of client and server applications independent of the underlying network protocols and device configurations. The basic middleware services offered by the intelligent messaging network architecture can include, e.g., client-server connectivity, platform transparency, network transparency, application tool support (through the use of APIs), network management, interaction with other network services, scalability and high availability.

System Overview

FIG. 1A depicts an exemplary embodiment of the communication system 100 including a detailed block diagram of the present invention. The communication system 100, in an exemplary embodiment, can be configured to support a wide variety of wired and wireless access network protocols via an access network 114. The access network 114 protocols can include, e.g., dial-up modem, analog cellular, digital cellular, cellular digital packet data (CDPD), Mobitex, RIM, Ardis, IDEN, personal communication system (PCS)-code division multiple access (CDMA) or time division multiple access (TDMA), global system for wireless messaging (GSM), two-way and one-way paging (e.g., Reflex, Flex, etc.), as well as geosynchronous earth orbit (GEO) or low earth orbit (LEO)

satellite network access protocols. The intelligent wireless messaging network of the present invention can provide network transparency to developers of client and server applications. As such, developers do not need to concern themselves with implementation details of the underlying network protocols or with various platform specific encoding, such as, e.g., big-endian and little-endian.

A number of the protocol gateways (PGs) 116a, 116b and 116c, collectively PGs 116, can be configured to support a specific network access protocol. The PGs 116, in an exemplary embodiment, can act as an interface between a network 114 and wide-area/local-area networks (WANs/LANs) 118a, and 118b. The PGs 116 can provide the flexibility to support multiple present and future wireless access protocols such as, e.g., GPRS. Networks 118 collectively including networks 118a and 118b, as shown, can be coupled to network 114 by, e.g., a router 114, and can be protected from unauthorized access through a firewall 120. Networks 118 can include, e.g., a wide area network (WAN), local area network (LAN), and/or the global Internet. Among other things, networks 118 can include, e.g., one or more back-end servers (BESs) 122a, 122b, and 122c, collectively BESs 122, that can run server applications that can communicate messages with client applications running on the client devices 112. Via one or more message routers (MRs) 124a, 124b, and 124c, collectively MRs 124, these messages can be routed between the BESs 122 and the PGs 116, and other network components. From the BESs 122, messages can be transmitted or delivered to, e.g., a content provider 140. A specific type of BES shown as an HTTP Proxy BES 132 can be used to send messages to an Internet server 142 such as a web server. It should be noted that although the present invention is described with reference to a specific exemplary architecture, a wide variety of WANs and LANs that can support wired and wireless environments are possible.

The PGs 116 can be responsible for sending and receiving application messages between client applications and a BES 122 that can support the service type of the application message. The message can be routed to the BES 122 via the MR 124 as will described further below with reference to FIG. 1C. For each network access protocol that the intelligent messaging network supports, a corresponding PG 116 can support that network access protocol. PGs 116 can communicate directly with one or more MRs 124 using, e.g., conventional TCP/IP communications or a modification of TCP/IP to address flow control between wireless and wireline networks. In an exemplary embodiment of the invention, the PGs 116 can use clustering for, e.g., redundancy, scalability and load-balancing of incoming IP traffic across all the nodes within a configured cluster. In an exemplary embodiment, PGs 116 can provide load balancing by providing traffic to MRs 124 in, e.g., a round-robin fashion, which can, e.g., transmit to least recently used MR 124. Under this arrangement, client applications can be configured to communicate to a single virtual IP address of the PG 116 cluster. Advantageously, this can provide the intelligent messaging network the flexibility to dynamically start and stop the PGs 116 without disrupting service. Typically, the PGs 116 can run outside of the firewall 120. However, the intelligent messaging network architecture of the present invention does not preclude the PGs 116 from running inside an enterprise firewall 120. It will be apparent to those skilled in the art that alternative configurations can also be used within the spirit and scope of the present invention.

The BESs 122 and MRs 124 can each have access to corresponding BES and MR databases (DBs) 126 and 128, respectively, which can store server application and message routing parameters. Alternatively, a shared database can be used to store information on an auxiliary memory device such as, e.g., a storage area network (SAN). The BES DB 126 and MR DB 128 can each maintain a common pool of information amongst the entire group of network servers. In an exemplary embodiment, this information, which can be independent of any specific messaging application, can be stored and accessed from a structured query language (SQL) database.

In order to assist network administrators in managing the intelligent messaging network, the intelligent messaging network architecture can incorporate one or more simple network management protocol (SNMP) management consoles 130a, 130b, and 130c, collectively SNMP console 130, as the mechanism for network management. SNMP is a standard network management protocol widely used in conventional TCP/IP networks. The console 130, e.g., can receive SNMP alerts. In an exemplary embodiment, a customer's SNMP console 130 can be "hooked" into, including such data as might reside in, e.g., a management information base (MIB) 134a. The SNMP console 130 can be used to easily and effectively manage the intelligent messaging network of the present invention. In addition to providing SNMP support, the intelligent messaging network can provide network administrators a tool to monitor the health of the network. An SNMP console 130 can be placed in a network operations center (NOC) to advantageously centrally manage the intelligent messaging network of the present invention.

An HTTP Redirector 106 can enable off-the-shelf web browsers such as, e.g., browser 104, to send and receive requests, such as, e.g., hypertext transfer protocol (HTTP) requests, over the intelligent messaging network. As described later, the HTTP Redirector 106 can work by intercepting HTTP requests from the browser 104 and can redirect them over the intelligent messaging network for fulfillment by an intelligent messaging network HTTP proxy back end server 132a, 132b, or 132c; collectively HTTP proxy back end servers (HBES) 132, which in turn can forward messages on to, e.g., other Internet servers 142. While the intelligent messaging network can provide a set of advanced services, the network can also offer support for external legacy services that might already be in use by an organization. By supporting other vendor services such as, cc e.g. security, and databases, the intelligent messaging network can fit into an existing legacy networking environment, thereby allowing organizations to use their existing networking environment.

An Exemplary Implementation Embodiment of the Present Invention

In an exemplary implementation embodiment of the present invention, the Intelligent Messaging Network of the present invention can use an Aether Intelligent Messaging (AIM) Network (also referred to as AIM.net) developed by Aether Systems Inc., of Owings Mills, Md., U.S.A., the assignee of the present invention.

In an exemplary implementation embodiment, the BES 122 can be an Aether Back End Server (ABES) available from Aether Systems Inc., of Owings Mills, Md., U.S.A.

In an exemplary implementation embodiment, the PG 116 can be an Aether Protocol Gateway (APG), also previously referred to as a frontend server (FES), available from Aether Systems Inc., of Owings Mills, Md., U.S.A.

In an exemplary implementation embodiment, the MR 124 can be an Aether Message Router (AMR) available from Aether Systems Inc., of Owings Mills, Md., U.S.A.

An exemplary embodiment of the MR DB 128 is an AIM database available from Aether Systems, Inc. of Owings Mills, Md., U.S.A.

In an exemplary implementation embodiment, the SNMP Console 130 can be an Aether SNMP Network Management Console available from Aether Systems Inc., of Owings Mills, Md., U.S.A., which can include an SNMP compliant network management application and hardware system platform.

In an exemplary implementation embodiment, the HTTP Proxy Back End Server 132 can be an Aether HTTP Proxy Back End Server available from Aether Systems Inc., of Owings Mills, Md., U.S.A.

It will be apparent to those skilled in the relevant art that alternative implementations incorporating alternative or additional components, systems, operating systems, and applications could also be used within the spirit and scope of the present invention.

Software Development Environment

The intelligent messaging network, in an exemplary embodiment, can provide multiple software development kits (SDKs) to assist, e.g., engineers in developing client and server applications. The SDKs can contain a consistent set of APIs and a set of platform specific libraries for all intelligent messaging network supported platforms and networks. In addition to the SDKs, the intelligent messaging network can provide developers a resource kit including a set of tools to assist the developers when designing, implementing, and testing their client and server applications.

As described later in detail, the intelligent messaging network can provide, in an exemplary embodiment, a mobile client and server SDK environment to assist engineers developing client applications and BESs 122. The SDKs can provide an easy to use API and a set of platform specific libraries to perform, e.g., compression, network management services, server-to-server communication, server registration/de-registration, and reliable message transport services.

I. Common Network Services

In an exemplary embodiment, all of the servers, PGs 116, MRs 124, BESs 122 can use, e.g., Windows NT 4.0 as their operating system available from Microsoft Corporation of Redmond, Wash., U.S.A. Although alternative operating systems can be used in alternate embodiments, as will be apparent to those skilled in the art, functionality of the present invention will be described in an exemplary Windows NT v.4.0 environment. All the servers provide a set of common services, including, e.g.:

network management;
NT event logging;
message trace logging;
run as NT services;
server registration;
server de-registration; and
server-to-server TCP/IP communication.

The intelligent messaging network server SDK can encapsulate the implementation of these core functions via application programming interfaces (APIs) to insulate application developers from the hardware, software and protocol details of the underlying platforms. Provided below is a description of exemplary common services.

A. Network Management Service

All intelligent messaging network servers can support the standard SNMP GET, SET, and GET NEXT operations. In addition, the intelligent messaging network servers can generate SNMP traps for notifying a network administrator of a critical event. The intelligent messaging network Server SDK can provide a common MIB, for basic control and status-handling that is shared by all the intelligent messaging network servers. In addition, the intelligent messaging network server SDK can provide a MIB for each supported server type (i.e. PG 116, MR 124, HTTP Proxy Back End Server 132, and BES 122). Developers developing BESs 122 can define custom MIBs to support functions specific to their application needs and can register the custom MIBs in a registered MIBs database 134. Registration of a custom MIB with the SNMP console 130 can be encapsulated by a set of network management APIs provided by the intelligent messaging network server SDK.

B. NT Event Logging Service

All intelligent messaging network servers can log critical information (e.g., start/stop time, and critical errors) to the NT event log on a corresponding platform on which they are running. Developers developing BESs 122 can log application specific events to the NT event log via APIs provided by the intelligent messaging network server SDK.

C. Message Trace Logging Service

All intelligent messaging network servers can optionally log inbound, outbound, and system events on the platform on which they are running. Developers developing BESs 122 can log application specific information to an application-info-log via APIs provided by the intelligent messaging network server SDK. In this way, developers are not required to know the implementation details of how to log a message to the inbound, outbound, or system-info-logs.

D. Run as NT Service

In an exemplary embodiment of the invention, all intelligent messaging network servers can run as NT services. Rather than having each server implement the necessary code to run as an NT service, a utility program called AimService-Any can be that can wrap NT service functionality around each intelligent messaging network server executable. The benefits of running a server as an NT service can include the following advantages:

Automatic Start on Reboot—Conventionally, when a reboot of a machine is necessary, the user re-booting can also log on and manually start any servers that need to be running on the machine. With an AutoStart function provided by the AimServiceAny, each intelligent messaging network server running as an NT service can automatically restart before the user logs on. This feature can be useful if, for example, the platform reboots at night without human intervention.

No NT Logon Required to Run—As an added security measure, intelligent messaging network servers can run without having anyone logged onto the machine and, thus, can prevent unauthorized users from accessing the platform and the servers.

Network Management Mechanism—In addition to SNMP, running as an NT service provides an additional simple network management capability by using a remote SvrMgr utility provided on all NT servers to monitor and start/stop intelligent messaging network services running anywhere on the network.

Startup Dependencies—An NT service can depend on the presence of other services before it is allowed to start (e.g. some intelligent messaging network servers depend on the fact that an SQL database server is running as well as possible server-to-server dependencies).

E. A Mechanism for Providing Discovery Services for Servers During Startup Sequence The intelligent messaging network can include various servers including, e.g., the following:

1. PGs 116;
2. MRs 124; and
3. BESs 122.

Figure 1B:
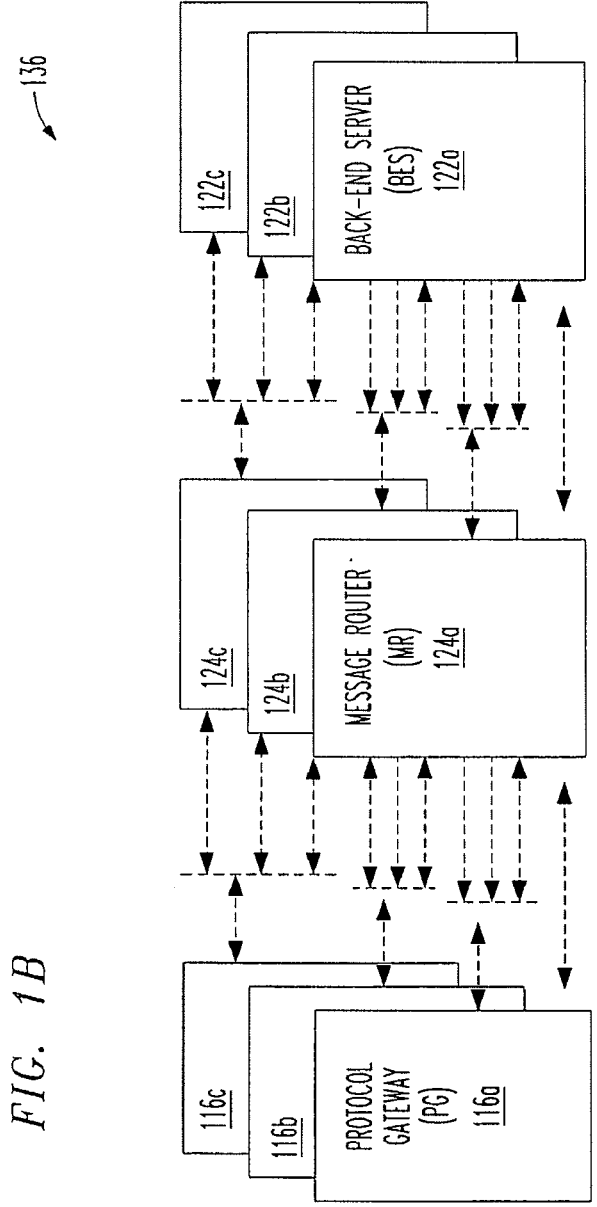
FIG. 1B is a high level block diagram of an exemplary embodiment of the present invention including an exemplary protocol gateway coupled to an exemplary message router which is coupled to an exemplary back-end server.

The simplest instance of an intelligent messaging network can include a server of each of the three types coupled together as depicted in the exemplary embodiment of FIG. 1B.

FIG. 1B depicts, in an exemplary embodiment, a high level block diagram 136 of the present invention including, e.g., one or more PGs 116*a-c* coupled to one or more MRs 124*a-c*, which are in turn, coupled to one or more BESs 122*a-c*.

Each server-to-server connection can include a TCP connection. As indicated in block diagram 136, PGs 116*a-c* can be coupled to MRs 124*a-c*; MRs 124*a-c* can be coupled to PGs 116*a-c* and BESs 122*a-c* (or HBESs 132*a-c*); and BESs 122*a-c* (or HBESs 132*a-c*) can be coupled to MRs 124*a-c*. Server startup logic can include, e.g., starting the servers 116, 122, and 124 in any order as each server can attempt to find the server(s) of the required type to which it is to be coupled. The server start sequence, in an exemplary embodiment, can proceed as follows:

1. Upon start-up, an intelligent messaging network server 116, 122 and 124 can create a TCP "listener" socket. The TCP listener socket accepts connection requests from other intelligent messaging network servers 116, 122 and 124.
2. The intelligent messaging network server then registers the following information about the server in the intelligent messaging network MR database 128:
   The IP address of the server and the port that the server is listening on for new connections;
   The server's intelligent messaging network Domain; and
     An intelligent messaging network Domain is a text string (e.g. "MyTestDomain") that allows multiple intelligent messaging networks to run on the same physical network without interfering with each other. An intelligent messaging network server can only connect to other intelligent messaging network servers in the same domain.
   The server's server type e.g.: PG 116, MR 124, or BES 122.
3. After the server registers itself in the MR database 128, the registering server can obtain a unique database registration identifier (ID) and then can search the MR database 128 for other registered servers in the server's intelligent messaging network domain and of the appropriate type; e.g., PGs 116 can search for MRs 124 in their domain, MRs 124 can search for PGs 116 and BESs 122, BESs 122 can search for MRs 124.
4. In the simplest intelligent messaging network, each server 116, 122 and 124 can ford one instance of each peer type to which it connects. However, the intelligent messaging network can allow multiple servers of each type to run within a domain in order to improve performance and redundancy. For example, in an exemplary embodiment, if there are 2 PGs 116 and 3 MRs 124, each PG 116 can be coupled to each of the MRs 124. For each peer server it fords in the database 128, the intelligent messaging network server can attempt to couple itself to that server on the peer server's TCP listener socket.
5. If the intelligent messaging network server 116, 122 and 124 successfully connects to a peer, establishing a TCP connection, the two coupled servers can then perform an intelligent messaging network "connection handshake" in order to verify the validity of the connection. The connection handshake can include the following sequence:
   a) The connecting server can send an intelligent messaging network ServerConnect message to the peer server. This message can contain the connecting server's unique database registration ID (obtained when the server first registered in the database, see step 2 above). The connecting server can then wait a specified amount of time for a reply from the peer server.
   b) The peer server can receive the intelligent messaging network "connection message" and can verify that the version included as part of the intelligent messaging network message is compatible with its own communications version and that the message is indeed an intelligent messaging network connection message. If the version is incorrect or the message is not a connection message, the peer server can terminate the TCP connection. If the peer server accepts the connection message it can send an intelligent messaging network connection message back to the connector in reply.
   c) When the connecting server receives a "connection reply message" the connecting server can also verify the message version and type and can either keep the connection open, or close the connection if, e.g., the version and type verification fail.
   d) If the connecting server does not receive an intelligent messaging network connection reply message within the specified time window, the connecting server can assume that the peer server is, e.g., not a valid intelligent messaging network server, or is functioning improperly and so it can close the TCP connection to the peer server.

Figure 1C:
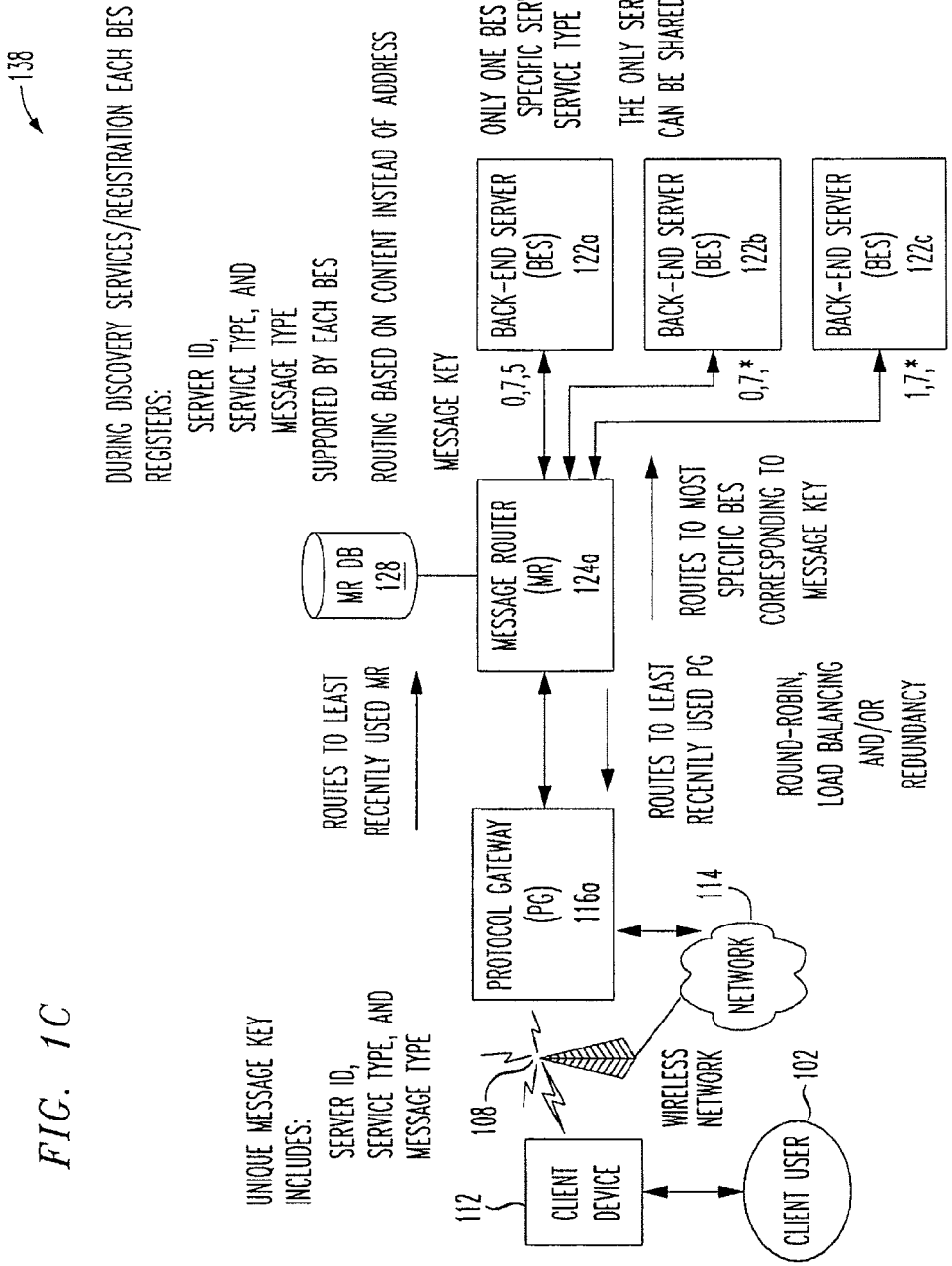
FIG. 1C is an exemplary embodiment illustrating messaging routing according to the present invention.

FIG. 1C is described below after FIG. 1F relating to MR 124.

PG Startup Sequence

Figure 1D:
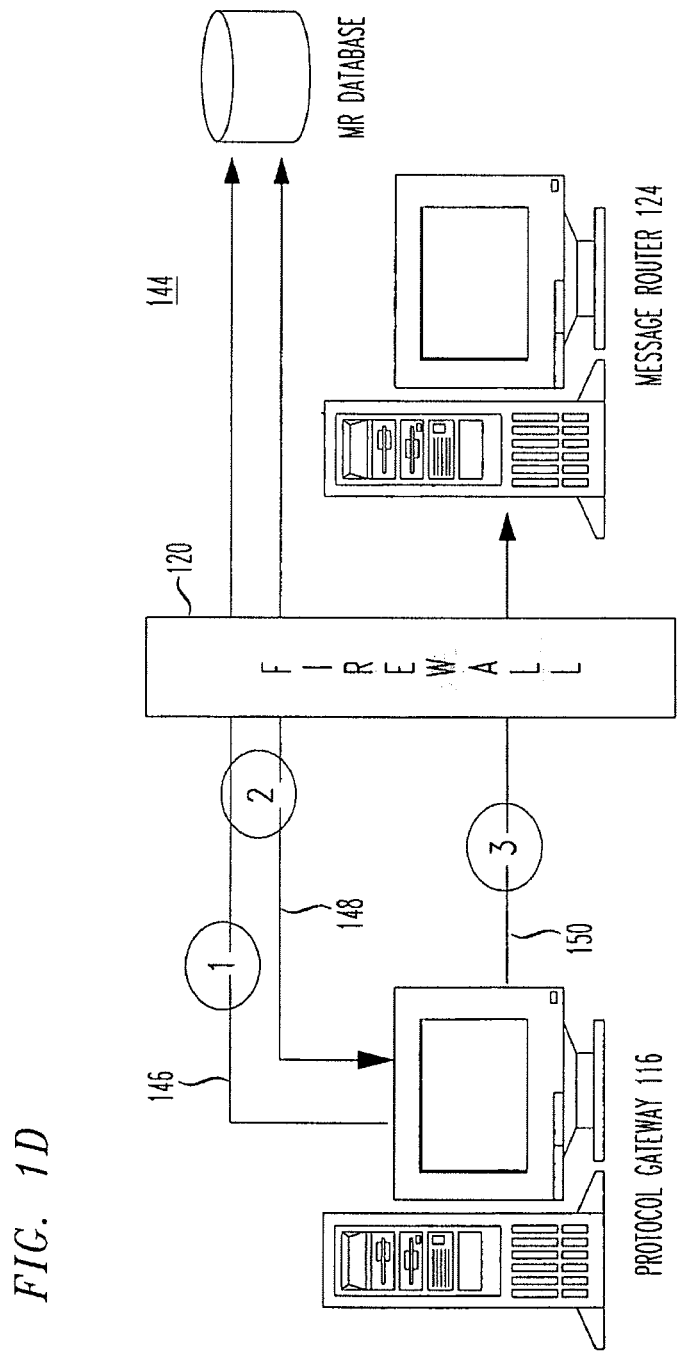
FIG. 1D is an exemplary embodiment illustrating a protocol gateway (PG) startup sequence according to the present invention.

FIG. 1D depicts a block diagram 144 illustrating an exemplary embodiment of discovery services message flow for a PG 116 startup sequence. The discovery service flow can begin with step 146.

In step 146, the PG 116 can use registration services provided by, e.g., the intelligent messaging network server SDK to register the PG 116 with the intelligent messaging network by adding an entry to a RegisteredServers table in the MR database 128.

From step 146 flow can continue with step 148.

In step 148, the PG 116 can use registration services provided by the intelligent messaging network server SDK to enumerate the list of all the MRs 124 registered with the intelligent messaging network in, e.g., the same domain. From step 148, flow can continue with step 150.

In step 150, using an IP address and listener port for each of the MRs 124, the PG 116 can use communication services provided by the intelligent messaging network server SDK to establish and manage a TCP/IP connection with each of the MRs 124 contained in the enumerated list. When a PG 116 couples itself to the MR 124, the MR 124 can add the PG 116 to its RegisteredServers cache and can begin to start forwarding messages to the PG 116. If a connection attempt fails, the PG 116 can re-attempt to connect to the MR 124, according to an exemplary embodiment of the present invention.

MR Startup Sequence

Figure 1E:
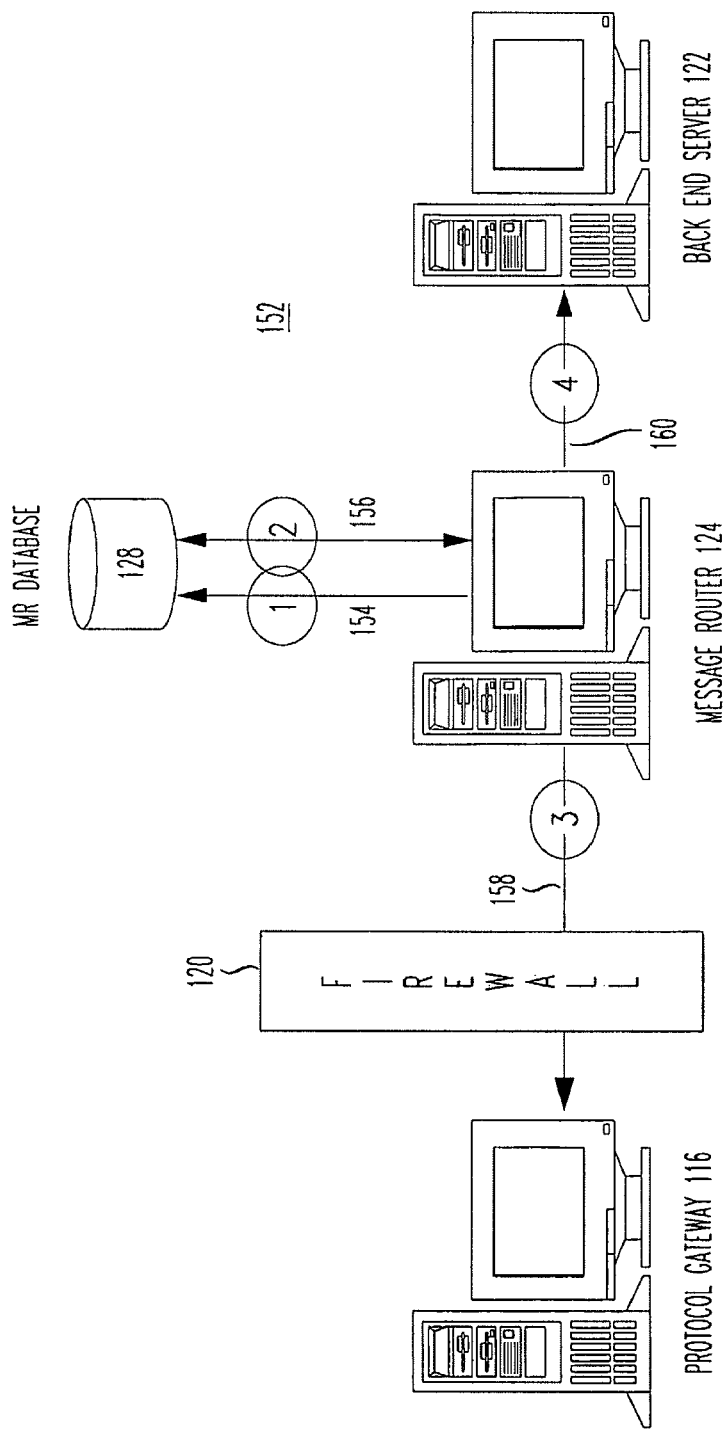
FIG. 1E is an exemplary embodiment illustrating a message router (MR) startup sequence according to the present invention.

FIG. 1E depicts a block diagram 152 illustrating an exemplary embodiment of discovery services message flow for a MR 124 startup sequence. The discovery service flow can begin with step 154.

In step 154, the MR 124 can use registration services provided by the intelligent messaging network server SDK to register itself with the intelligent messaging network by adding an entry to the RegisteredServers table in the MR database 128. It will be apparent to those skilled in the art that an alternative database could be used. From step 154, diagram 152 can continue with step 156.

In step 156, the MR 124 can use registration services provided by the intelligent messaging network server SDK to enumerate a list of, e.g., all PGs 116 and BESs 122 registered with the intelligent messaging network. From step 156, diagram 152 can continue with step 158.

In step 158, using the IP Address and listener port for each PG 116, the MR 124 can use communication services provided by the intelligent messaging network server SDK to establish and manage a TCP/IP connection with, e.g., each PG 116 contained in the enumerated list. When a MR 124 couples to a PG 116, the PG 116 can add the MR 124 to its Server Connections cache and can begin to start forwarding messages to the Message Router. From step 158, diagram 152 can continue with step 160.

In step 160, using the IP address and listener port for each BES 122, the MR 124 can uses communication services provided by the intelligent messaging network server SDK to establish and manage a TCP/IP connection with each BES 122 contained in the enumerated list. When a MR 124 couples to a BES 122, the BES 122 can add the MR 124 to its Server Connections cache and can begin to start forwarding messages to the MR 124.

BES Startup Sequence

Figure 1F:
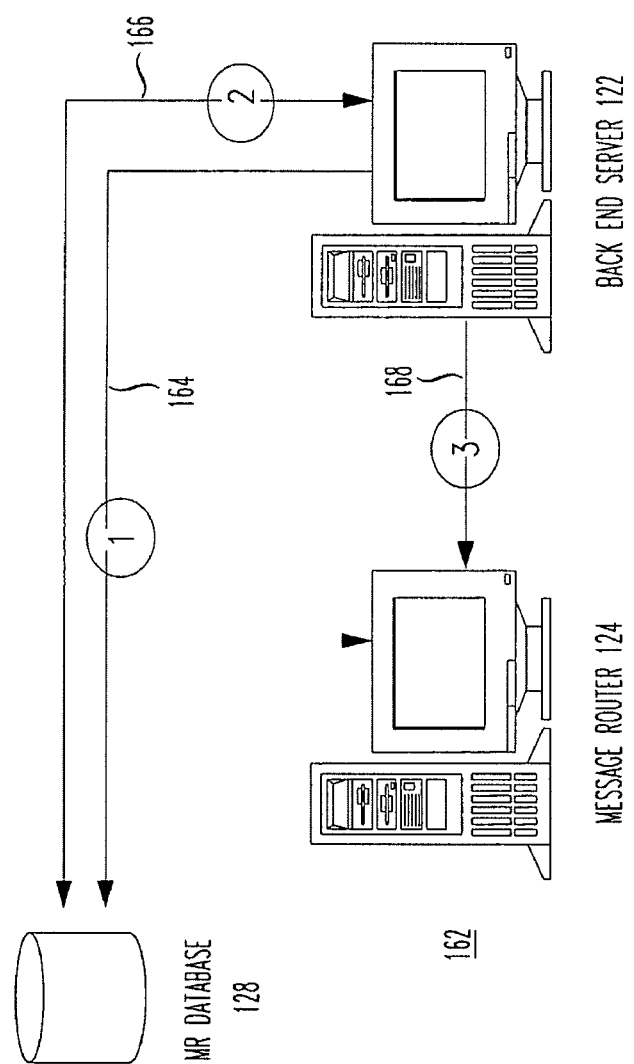
FIG. 1F is an exemplary embodiment illustrating a back end server (BES) startup sequence according to the present invention.

FIG. 1F depicts a block diagram 162 illustrating an exemplary embodiment of discovery services message flow for a BES 122 startup sequence. The discovery service flow can begin with step 164.

In step 164, the BES 122 can use the registration services provided by the intelligent messaging network server SDK to register itself with the intelligent messaging network by adding an entry to the RegisteredServers table in the MR database 128. From step 164, diagram 162 can continue with step 166.

In step 166, the BES 122 can use registration services provided by the intelligent messaging network server SDK to enumerate the list of, e.g., all MRs 124 registered with the intelligent messaging network. From step 166, diagram 162 can continue with step 168.

In step 168, using the IP address and listener port for each MR 124, the BES 122 can use the communication services provided by the intelligent messaging network server SDK to establish and manage a TCP/IP connection with each MR 124 contained in the enumerated list. When a BES 122 can couple to a MR 124, the MR 124 can add the BES 122 to its RegisteredServers cache and can begin to start forwarding messages to the BES 122. If the connection attempt fails, the BES 122 can reattempt to connect to the MR 124.

F. Server Connection Race Condition Handling

If two peer intelligent messaging network servers are started at approximately the same time, it is possible that each will attempt to connect to the other, thus establishing two connections between them rather than a desired single connection. The possibility of colliding connection requests is the reason that during the connection handshake, the servers exchange unique database registration IDs. Each server can use the unique database registration ID to keep track of which servers it is already connected to, so that if server A establishes a connection to server B, and due to race conditions server B immediately establishes another connection to server A, server A can use the unique database registration ID passed by server B to realize that it already has a connection to server B and thus can drop the new connection.

G. Server Registration Service

When an intelligent messaging network server is started, it can register itself with the network by adding an entry to a RegisteredServers table in the intelligent messaging network MR database 128. This can enable other intelligent messaging network servers to locate one another on the network. An API provided by the intelligent messaging network server SDK can allow for registering the following server attributes in the intelligent messaging network MR database 128:

Server Class—PG 116, BES 122, and MR 124;
Server Type—PGs 116 types can include CDPD, Mobitex and ISP dialup. BES 122 types can depend on the server application;
Packet Header Version—can indicates the version of the packet header that the all server supports; and
IP Address and Listener Port—can indicate the IP address and the listener port number to be connected to by other servers in order to communicate with this server.

H. Server De-Registration Service

When an intelligent messaging network server is stopped, it can de-register itself from the network by removing its entry from the RegisterServers table in the intelligent messaging network MR database 128. An API can be provided by the intelligent messaging network server SDK to de-register a server in the intelligent messaging network MR database 128.

I. Server-to-Server TCP/IP Communications Service

In an exemplary embodiment of the invention, intelligent messaging network servers can communicate with each other over a TCP/IP socket connection. APIs provided by the intelligent messaging network server can encapsulate the creation, management, and sending/receiving of data over the socket connection.

II. Server-Specific Services

In addition to the above-described common set of services, each server can also provide additional services that can be specific to the functionality of the server. Thus, in an exemplary embodiment, the intelligent messaging network architecture can include various core software components that can run on, e.g.:

PG 116;
MR 124;
BES 122;
HTTP Proxy Back End Server 132; and
SNMP Management Console 130.

A. Protocol Gateway PGs Operation and Services

Using the registration services provided by the intelligent messaging network server SDK, the PGs 116 can follow a predefined start up sequence to register itself with the intelligent messaging network. Each PG 116 can add an entry to the RegisteredServers table in the intelligent messaging network MR database 128 and can enumerate the list of all MRs 124 registered with the network in the same domain. Based on the IP address and listener socket for each MR 124, the PG 116 can establish and manage a TCP/IP connection with each MR 124 contained in the enumerated list. When a PG 116 connects to an MR 124, the MR 124 can add the PG 116 to its RegisteredServers cache and can begin forwarding messages to the PG 116. If, however, the connection attempt fails (e.g., there is a timeout), the PG 116 can re-attempt to connect to the MR 124 after a configurable time period.

In addition to the above-described common services, the PGs 116 can be responsible for supporting the following specific services:

1. Encapsulate the Network Communications Protocol

Each PG 116 can encapsulate the underlying wireless network access protocol so that it is transparent to MR 124 and BESs 122. As a result, when the MR 124 receives a message from a PG 116, it is unaware of the underlying network access protocol used for communicating the message.

2. Message Segmentation

All messages to be transmitted over the network that exceed a predefined segment size can be segmented into multiple message segments.

3. Message Re-Assembly

All incoming message segments (except the last segment to complete the message) received (including duplicate segments) can be immediately acknowledged back to the peer wireless protocol layer and can be queued pending receipt of all message segments via an inbound message map. When the last segment to complete the message is received, the PG 116 does not immediately send an acknowledgment to the peer wireless protocol layer. Instead, the message segments can be assembled into a complete message, which can be forwarded to an appropriate BES 122 via an MR 124. When the BES 122 successfully receives the message and acknowledges the same to the PG 116 via MR 124, then the PG 116 can acknowledge the last segment received thus completing the acknowledgment of the entire message. An inbound message map can manage a separate inbound message map for each unique link station ID of a sender.

4. Message Segment Duplication Detection

When a message segment has been received for a segmented message, the PG 116 can check to make sure the message segment has not been already received (i.e., a duplicate message segment). If the message segment is a duplicate, the segment can be acknowledged to the peer wireless protocol layer, discarded and conditionally logged.

5. Message Duplication Detection

When all message segments have been received for a message, the segments can be assembled into a complete message. If the message ID of the assembled message has been already received (duplicate message), then the message can be acknowledged to a corresponding peer wireless protocol layer, discarded and conditionally logged. Each PG 116 can keep track of the last n message IDs received for each unique link station ID.

6. Message Pacing/Message Retries/Message Time Outs

Any message that is bound for a client device 112 can be segmented into a number of segments greater than a segmented pacing threshold and can be sent at a pacing interval. The threshold and interval can be configurable prior to a gateway protocol startup. Each PG 116 can automatically retransmit any message segment transmitted over the network that is not acknowledged by a corresponding peer wireless protocol layer within a configurable amount of time. The PG 116 can retry a configured number of times before notifying a BES 122 that the message could not be delivered to a client application.

7. Forwarding of Ack/Nack Messages

When a message segment is transmitted over the network 212, each PG 116 can retain knowledge of all outstanding message segments pending acknowledgment (message segments that have not been acknowledged by the peer wireless protocol layer) via a pending acknowledgment map. The pending acknowledgment map can maintain information pertaining to message segments that have been successfully transmitted and are pending acknowledgment from the peer wireless protocol layer. If an acknowledgment (positive or negative) is received for a message segment that is not pending acknowledgment, the segment can be discarded and conditionally logged.

When all message segments have been positively acknowledged by the peer wireless protocol layer, the PG 116 can sen, as shown in step 5 of FIG. 7, an ACK control message to the BES 122 via MR 124 (provided that the BES 122 has requested such notification) to indicate the message has been successfully delivered to the client application. If the number of transmission attempts for the message segment exceeds a configurable number of retry attempts, the PG 116 can send an NACK control message to the BES 122 to indicate that the message could not be delivered to the client application.

B. Message Router MR Operation and Services

Each MR 124 can communicate with the PGs 116 and BESs 122. Upon start up, the MR 124 can use the registration services provided by the intelligent messaging network server SDK to register the MR 124 itself with the intelligent messaging network by adding an entry to the RegisteredServers table in the MR database 128. The MR 124 can also use the registration services to enumerate the list of all the PGs 116 and BESs 122 that are registered with the intelligent messaging network. Using the IP address and listener port or socket for each PG 116, the MR 124 can establish and manage a TCP/IP connection with each PG 116 contained in the enumerated list. When an MR 124 connects to a PG 116, the PG 116 can add the MR 124 to its Server Connections cache and can begin to start forwarding messages to the MR 124. Based on the IP address and listener port for each BES 122, the MR 124 can also establish and manage a TCP/IP connection with each BES 122 contained in the enumerated list. See FIG. 1C. When a MR 124 connects to a BES 122, the BES 122 can also add the MR 124 to its Server Connections cache and can begin to start forwarding messages to the MR 124.

Each MR 124 can also use the registration services provided by the intelligent messaging network server SDK to de-register itself from the intelligent messaging network by removing its entry from the RegisteredServers table in the MR database 128. The MR 124 can close the TCP/IP connection with each PG 116. Each PG 116 can also remove the MR 124 from its Server Connections cache and can immediately stop forwarding messages to the terminating MR 124. Then, the MR 124 can clean up any previously allocated resources and can terminate.

FIG. 1C depicts an exemplary embodiment illustrating messaging routing according to the present invention. FIG. 1C illustrates a client user 102 using a client device 112 can attempt to communicate via wireless network 108 and network 114 to resources coupled to PG 116. As shown, BESs 122a, 122b and 122c can have already registered upon boot with MRDB 128 of MR 124. Advantageously, according to the present invention, routing can be based on content instead of address. Registration or discovery can include a providing server identifier (ID), a service type, and a message type supported by the particular BES 122. MR 124 can load into the cache of MR 124, the registration information about BESs 122.

MRs 124 and BESs 122 can communicate via a TCP/IP connection. As shown, BES 122a can be registered for service type 7 and message type 5. BES 122b can be registered for service type 7 and all message types as illustrated by an asterisk (*) wildcard character. Each BES can have a unique server ID and service type combination. The only server ID that can be shared is 0 (zero).

The client device 112 can communicate with PG 116 and can send a message including a unique message key. The unique message key can include, in an exemplary embodiment, a server identifier (ID), a service type and a message type, as shown. The PG 116 can provide the MR 124 the message over network 118b.

PG 116, in an exemplary embodiment, can route to a least recently used MR 124, providing a round-robin load balancing function. In an exemplary embodiment, redundancy can be provided by using, e.g., multiple PGs 116 and multiple MRs 124. Similarly, when an MR 124 has a message to route to a PG, in the case of an alert or a response, the MR 124 can similarly use a round-robin load balancing method to route the message to a least recently used PG 116 supporting the protocol of the client device 112 associated with the message.

Also, MR 124 can route a message received from the PG 116, to a BES 122 or HBES 132. MR 124 can route the message, in an exemplary embodiment, according to a set of semantic rules. In an exemplary embodiment, the message can be routed to the BES 122 which most specifically corresponds to the contents of the message key. In an exemplary embodiment if more than one BES 122 corresponds specifically to the message key, the least recently used BES 122 can be used by checking a time stamp identifying the last access to the BES 122.

As an illustrative example, suppose client device 112 sends a message containing a message key {server ID=0; service type=7; and message type=5} to a BES 122. In the exemplary illustration, PG 116 would forward the message to the least recently used MR 124. MR 124 could look at the message key {0, 7, 5} to determine how to route the message. Based on the example registrations described above for BES 122a {0, 7, 5}; BES 122b {0, 7, *}; and BES 122c {1, 7, *}, MR 124 could route the message to BES 122a since the BES 122a most specifically corresponded to the message key by having the exact service type and message type as the message key. It is important to note that BES 122b with a wild card asterisk for supported message type could also support the message if BES 122a was not available. The semantic rules could use the BES 122b as an alternative routing destination, if BES 122c is unavailable.

For purposes of sending follow-on messages to a particular BES 122, in an exemplary embodiment, a specific server ID can be placed in a message. In an exemplary embodiment, only one BES 122 will have a specific combination of server ID and service type.

In addition to the common services that all intelligent messaging network servers support, the MRs 124 are responsible for supporting the following specific services:

1. MR Message Authentication Service

The MR 124 can be responsible for determining that the sender of a message is an authorized customer of the intelligent messaging network. When the source of a message is a client device 112, the MR 124 can use the device's source address (e.g., IP address or Mobitex MAN number) of the client device 112 as the means of identifying authorized access.

When each MR 124 receives a client message, it can check the device address against a local cache of authorized devices 112. If the source address is not found locally, the MR 124 can then check the MR DB 128. If the device address is an authorized client device 112, in an exemplary embodiment, and the customer has permission rights to the requested service type, and the requested service type is not in use by the customer's account with a different source address, the MR 124 can cache the device address, customer identifier, and requested service type to ensure fast authentication of additional messages from the same source. Then, the message can be considered authentic and can be forwarded to the proper BES 122. Each MR 124 also can pass the customer identifier to the BES 122 to use as a key to search for customer specific information.

In order to support dial-up access, in an exemplary embodiment, message authentication based on the device's source address is not used, because during a dial-up access, the source address that can be seen by an MR 124 is the IP Address of the ISP provider. Each subscriber that desires wire-line access can have a User ID and Password, which can be selected by the subscriber at the time they subscribe to a service, and can be saved as part of the MR DB 128.

Each MR 124 can initially follow the same procedure to authenticate a dial-up message as it does when authenticating a wireless message. However, in case a message is received from a dial-up connection, the MR 124 can issue an authentication challenge to the message source. On receiving the challenge, the client application can prompt the user 102 to enter the user ID and password of the user 102, which can be forwarded (encrypted) to the MR 124 as an authentication request and can proceed with authentication process.

Once a message source has been authenticated, the MR 124 can check the service type and source address of subsequent messages against its authentication cache and can allow/disallow the message as appropriate. Preferably, in an exemplary embodiment, the MR 124 does not keep the cached mapping between a source address and valid customer indefinitely. A configurable timeout period may be specified, after which cached entries can be removed. The timeout interval can be the length of time that has passed between successive messages from a cached client device 112. When a client device 112 times EC 15 out due to inactivity, the MR 124 can remove it from its cache. For dial-up devices, the MR 124 can also decrement a device's authentication count within the intelligent messaging network MR database 128. The authentication count can indicate how many other MRs 124 have heard from the client device 112. When a dial-up device's authentication count drops to zero, the device address can be removed from the MR DB 2. MR Client Message Routing Service According to an exemplary embodiment of the invention, there can be several ways in which an MR 124 can route a client message to a BES 122, including, e.g.:

Indirect Routing—via an indirect routing table that can map message keys (service type and message ID) to a registered BES 122 that supports the message key; and Direct Routing via targeting messages at a specific BES 122.

The form of routing can be determined based on the contents of an intelligent messaging message header. The intelligent messaging message header or message key can be pre-fixed to every application message.

The intelligent messaging message header can contain the following fields, e.g.:

a 1-byte Server ID that can identify a specific server of the given service type. The value 0 can be reserved to indicate that indirect routing is desired. A non-zero value can indicate that the message is directed at a specific BES 122;

a 12-bit Service Type Identifier, which can be used by both indirect and direct routing, can identify the type of service (e.g., MarketClip, FX, etc.) associated with the messages; and a 12-bit Message Type Identifier that can uniquely identify the message within the context of the specified service type required for direct muting.

a. Indirect Routing

When an MR 124 receives an incoming message from a client application, it can check the Server ID field contained in the intelligent messaging message header portion of the message. If the Server ID field of the intelligent messaging message header is zero, the MR 124 can route the message to the proper BES 122 by consulting a routing table that can map message keys (Service Type and Message ID) to the IP address of one or more connected BESs 122a-c as described above with reference to FIG. 1C.

During server registration, all BESs 122 can be required to register a list of supported message keys. To minimize the number of entries that are made in the routing table, if a given BES 122 supports the majority of messages for a specific Service Type, it need only register a single root message key including only the Service Type. The small subset of service messages not supported by that BES 122 would be registered as individual message keys by a different BES 122 of the same Service Type. The MR 124 can route messages based on the most specific key value (Service Type, Server ID, and Message ID) found in the table. If no specific mapping is found, the MR 124 can use the Service Type portion of the key to look for root message entries. If the MR 124 locates more than one BES 122 that satisfies the message key match, it can use a round-robin scheduling procedure to pick which target BES 122 to route to. For example, the timestamp of last access of the BES can be consulted to determine a least recently used BES 122.

Consider, e.g., two third party services, MarketClip and FX, Reuters® news service solutions for real-time reporting on equities and foreign exchanges, with messages for each application supported by a corresponding BES 122. Under the configuration of the invention, each application BES 122 could only have to register its root service type (e.g., MktMon or FX) in order for its messages or responses for client devices 112 to be routed correctly by the MR 124. Suppose that two BESs 122 currently support news requests independently of one another (i.e. there is no common news BES 122 that both of them use), but a separate news BES 122 can be created to handle ALL news requests. Ideally, no new software should be sent to service providers so that all future news messages (for either application) are tagged to go to the new news server. Rather, the new news BES 122, upon registration, can add the specific news message keys previously handled by the MarketClip and FX BESs 122 to the MRs 124 message routing table.

It should be noted that the original BESs 122 do not need to change because the news BES 122 message keys can contain the service types and message IDs specific to the two applications. Each MR 124 can do its primary muting based on the more specific table entries, the same news messages that would have formerly been muted to the two BESs 122, could get routed to the new news BES 122. Thus, the BESs 122 can be designed around specific services, rather than a suite of services that comprise an application, some of which may be common to other applications. Under this arrangement, overall response performance can improve as specific services are assigned to their own BES 122. This is because a client application not using a given service does not have to wait, while the BES 122 is accessing process requests for a different service.

b. Direct Routing

BESs 122 that can maintain state information about a particular client device 112 can often require direct routing. For a client to ensure that a message reaches a specific BES 122, the intelligent messaging network message header portion of the message can contain a non-zero value in the Server ID field. When an MR 124 sees a non-zero value in the Server ID field, it can route the message to the proper BES 122 by consulting a routing table that maps server keys { Service Type, Message ID, Server ID} to the IP address of a connected BES 122.

Specifying a Server II) alone can be not sufficient to ensure that the message is delivered to the proper BES 122. Even when using direct routing, a BES 122 can register the service types and message IDs it can handle; and the service type/message ID of a direct route message can match those types registered by the BES 122 with the specified Server ID. Management of BES 122 IDs can be the responsibility of the application: If an application runs more than one BES 122 with the same Server ID, then messages with that Server ID can be routed to the BES 122 whose message routing table can contain the most specific match with the messages service type and Message ID. If two BESs 122 can map the same Server ID, Service Type, and Message ID, then, as in indirect routing, the MR 124 can use round robin scheduling to pick a target BES 122.

A BES 122 may use both direct and indirect routing on an as needed basis. To illustrate this, consider a BES 122 that for the most part is stateless, but has one or two logical operations that can require several targeted client/server messages to complete. If the BES 122 can initiate an operation that can require a targeted response, it can place its Server ID in the intelligent messaging network message header portion of the message it sends to the client application. When the client application responds, it uses the same Server ID in the response message to assure that the response is sent to the original Server. All other "stateless" messages can be sent with a Server ID of 0, so that they can be indirectly routed.

3. MR Back-End Server BES Message Routing Service

BES 122 messages sent to a client application can pass through the MR 124. Each MR 124 can decide which PG 116 to which to forward the message. The MR 124 can choose the proper PG 116 based on, e.g., the communications type (e.g., CDPD, Mobitex, ISP Dialup, etc.) used by a subscriber's service provider. The mapping of communication type to client device address can be maintained by the MR 124 based on fixed entries in the MR DB 128 that can map source address of a client device 112 or used ID and password to a specific communication type. Each PG 116 can also indicate the communication type of the PG 116 during the server registration process. If a PG 116 could not deliver a message to the client application, the PG 116 can send a network control non-acknowledgement (NACK) message to the BES 122 that originated the message, indicating that the message could not be delivered.

4. Send via clientDeviceInfo

When a BES 122 sends a message to a client application in response to a received request message, the client device address (referred to, as its clientDeviceInfo), which is a part of the received request message, can be known to the BES 122. In response, the BES 122 can provide the clientDeviceInfo as part of the AIMSvrPacket sent to the MR 124. Consequently, the MR 124 can then simply pass this information to the appropriate PG 116, which can then send the message to that client device 112 address.

5. Send via CustomerID At times, a BES 122 may need to asynchronously send a message to a subscriber (e.g. MarketClip Alert). Since this message is not in response to an incoming client message, the clientDeviceInfo may not be readily available to the BES 122. Rather than forcing the BES 122 to keep a mapping between client identifiers and their LinkStationIDs, a BES 122 may send a message to a client based solely on the customer ID. In this case, the AIMSvrPacket sent to a MR 124 contains a NULL LinkStationID and a valid client ID. The receiving MR 124 can search it's authenticated device cache for an active device associated with the specified client ID and then can use the device's LinIcStationID to forward the message to an appropriate PG 116.

C. Back-End Server BES Operation and Services

A BES 122 is an application specific server that can implement logic to process messages specific for that type of server. For example, an FX BES 122 can handle requests related to foreign exchange functions. A BES 122 can communicate directly with one or more MR 124s. Typically, BESs 122 can run behind the firewall 120. However, the intelligent messaging network architecture cannot preclude BESs 122 from running outside the firewall 120.

Excluding the application logic, which may be complex, the development effort to implement a BES 122 can be relatively straightforward. The intelligent messaging network Server SDK can encapsulate those functions that are common to all BES 122s, thereby insulating developers from, e.g., details of transport control, compression, registering and de-registering with the MR DB 128.

Similar to other servers, the BESs 122 can use the registration services provided by the intelligent messaging network server SDK to register themselves with the intelligent messaging network by adding an entry to the RegisteredServers table in the MR DB 128. Each BES 122 can establish a TCP/IP connection with each registered MR 124, using a corresponding IP address. When a BES 122 connects to an MR 124, the MR 124 can add the BES 122 to its RegisteredServers cache and can begin to start forwarding messages to the BES 122. When de-registering itself from the network, each of the BESs 122 remove its entry from the RegisteredServers tables in the intelligent messaging network MR database 128. The BES 122 can notify each MR 124 of its impending shutdown. This can allow each MR 124 to remove the BES 122 from its RegisteredServers cache and can immediately stop forwarding messages to the terminating BES 122.

In addition to the common services, the BESs 122 can be responsible for supporting the following specific functions:

1. Application Protocol Aware Service

From the perspective of the BES 122, the BES 122 can directly with a client application. In reality however, a BES 122 can communicate with one or more MRs 124. In the intelligent messaging network architecture, only the BESs 122 can have knowledge of the application content required to communicate with a client application.

2. Extended Intelligent Messaging Network Compression

In the exemplary embodiment, intelligent messaging network can provide an Adaptive-Huffman base compression service. The intelligent messaging network architecture can provide the necessary hooks to enable $3^{rd}$ party OEM compression mechanisms. If a BES 122 has specific compression requirements for its application data that are not addressed by intelligent messaging network supplied compression services, (i.e. Adaptive-Huffman); the BES 122 can be responsible for providing the compression mechanism.

3. Security Services

The architecture can provide the necessary hooks to enable $3^{rd}$ party OEM security mechanisms. If a BES 122 has specific security requirements for its application data, the BES 122 can be responsible for providing the security mechanism.

4. Forwarding of Ack/Nack Messages

When a client message is delivered to the BES 122, the BES 122 can send a network control acknowledgement (ACK) message to a PG 116 that originally received the message. When the PG 116 receives the network control ACK message from the BES 122, it can send a transport level ACK message to the client device's peer wireless protocol layer indicating that the message was delivered successfully to the BES 122.

III. Intelligent Messaging Network MR Database

In an exemplary embodiment of the present invention, an intelligent messaging network database can use an AIM Database available from Aether Systems of Owings Mills, Md., U.S.A. which, can maintain a common pool of information between intelligent messaging network servers. This information, which is independent of any specific messaging application, can be stored and accessed from a SQL database known as, e.g., the MR DB 128, or the BES DB 126. In an exemplary embodiment, the MR DB 128 can be shared by all intelligent messaging network servers 116, 122, and 124. The following sections describe the tables that comprise the intelligent messaging network MR database 128 schema. It will be apparent to those skilled in the art that the schema could also be used for another database, such as, e.g., BES DB 126.

1.1 Schema 1.1.1 ServiceTypes Table

The ServiceTypes table is a list of all the service types supported by the intelligent messaging network.

| ServiceTypes Table | | |
|---|---|---|
| Column Name | Type | Description |
| ServiceName | varchar[30] | Service Name |
| TypeID | int | ID of the Service |
| AllowMultiAccess | bit | True if service allows multiple device access from a single user, false if only allows single device access from single user concurrently |

1.1.2 RegisteredServers Table

The RegisteredServers table is used during the connection process and keeps track of the location and type of all Servers currently running on the Network. Access to this table is through the Server SDK.

| RegisteredServers Table | | |
|---|---|---|
| Column Name | Type | Description |
| DbID | long | Unique DB ID used for cross referencing |
| ServiceName | varchar[30] | Server Name |
| Class | int | Server Class e.g. FES (PG), BES, MR 124 etc |
| SubClass | int | Server Subclass e.g. CDPD, Mobitex, etc |
| DeathCount | int | The number of times connecting Servers have failed to connect to the Server |
| ServerId | byte | Optional ID used for Server-Specific Message Routing |
| NetHdrVersion | int | Network header version supported by this Server. |
| IP Address | varchar[15] | Network location of Server |
| Port | short | Listener port Server monitors for connection requests |
| PortB | short | A second port the Server monitors |
| Domain | varchar[20] | Name of the Domain the Server is running in |
| Registration Time | FILETIME | Date/Time when Server registered |

1.1.3 ServerMsgMap Table

The ServerMsgMap is accessed during Server Registration, MR 124 Start-UP and client Message Routing. This table maps a running Server to the set of Message's that should be routed to that Server. Access to this table is through Intelligent messaging network Server SDK.

| ServerMsgMap Table | | |
|---|---|---|
| Column Name | Type | Description |
| ServerDBID | long | Cross reference to DBID column in RegisteredServer Table |
| ServiceType | int | Type of Service message handled by this Server |
| MessageID | int | Message Identifier of message handled by this Server |
| ServerID | byte | Optional ID used for Server-Specific Message Routing |

1.1.4 AuthorizedUsers Table

The AuthorizedUsers table is accessed during Message authentication. The table contains a list of UserIDs/Pass-words with authorized access to the intelligent messaging network Network. Access to this table is through the Server SDK.

| AuthorizedUsers Table | | |
|---|---|---|
| Column Name | Type | Description |
| UserID | varchar[25] | Identifier chosen by the customer e.g. (rudy, RudyB etc). This is the login ID for ISP dial-up service. |
| Password | varchar[25] | Customer Password |
| AccountNo | char[8] | Customer Account Identifier |
| CustomerID | long | Unique CustomerID used for cross referencing |

1.1.5 AuthorizedDevices Table

The AuthorizedDevices table is accessed during message authentication. This table contains a list of device addresses with authorized access to the intelligent messaging network Network. Entries may be permanent (a Mobile client Device) or temporary (a Wire-line device). Access to this table is through the intelligent messaging network Server.

| AuthorizedDevices Table | | |
|---|---|---|
| Column Name | Type | Description |
| DevAddress | varchar[25] | Mobile client device address (IP, MAN, etc) |
| Wireline | bit | 0 = Mobile client, 1 = Wire-line |
| CommType | int | Communication Type (CDPD, Mobitex CDMA, etc) of the client device |
| Authentication Count | int | No. of MRs 124 currently aware of this device |
| AccessFlag | int | Used to block access for devices reported missing or stolen |
| CustomerID | long | Cross reference to Customer ID in AuthenticatedUsers table |
| Token | long | Token used for security with wireline devices |

1.1.6 UserRights Table

The UserRights table is accessed during message authentication. This table contains the service types an authorized user can access. Access to this table is through the Server. SDK.

| UserRights Table | | |
|---|---|---|
| Column Name | Type | Description |
| CustomerID | long | Cross reference to CustomerID in AuthenticatedUsers table. |
| ServiceType | int | Service Type the Customer is authorized to use. Cross reference to TypeID in ServiceType table. |

1.1.7 ActiveUsers Table

The ActiveUsers table is accessed during message authentication. This table contains the list of active customer IDs and the services they are using with a count of MRs 124 that have authenticated the account for the service in use. The purpose of the table is to detect and prevent multiple devices from accessing a service with same customer II) when the AllowMultiAccess bit is "false." Also, the table contains the LinkStationType and LinkStationID used by the customer so the MRs 124 can support NULL LinkStationID from the BES 122. Access to this table can be through the intelligent messaging network server.

| ActiveUsers Table | | |
|---|---|---|
| Column Name | Type | Description |
| CustomerID | long | Cross reference to CustomerID in AuthenticatedUsers table. |
| ServiceType | int | Service type in use by Account No |
| MRCount | byte | Number of MRs 124 that have authenticated the account for the service in use |
| CommType | smallint | Communication Type (CDPD, Mobitex, etc) of the client device |
| LinkStationID | varchar[25] | IP/Port or Mobitex Address |

1.1.8 Comm Types Table

The CommTypes table is a list of all communication Protocols supported by the intelligent messaging network.

| CommTypes Table | | |
|---|---|---|
| Column Name | Type | Description |
| CommName | varchar[25] | Name of the communication Protocol |
| TypeID | smallint | Communication Type ID |

1.2 Stored SQL Procedures

SQL procedures are used to manage the database. The following is a list of definitions commonly used as parameters in the stored SQL procedures.

CustomerID—The customer's unique identifier.

UserId—The user Id is used to authenticate ISP dial-up access.

Password—The password is used to authenticate dial-up access.

AccountNo—The account number can be both alpha and/or numeric and is for customer service purposes.

ServiceType—The service type the customer is provisioned to access. For example, MarketClip, MarketTrader, etc.

DeviceAddress—For CDPD devices, this is an IP address in dot notation. For Mobitex, this is a MAN number.

CommType—The type of Network Protocol the client device is using to access the intelligent messaging network Network. For example, CDPD, Mobitex, CDMA.

DeviceType—The type of access to the intelligent messaging network Network, either wireless or wireline.

NotifyAMR—True to notify all MRs 124 and false to not notify.

ReturnCode—The return code from the stored procedure.

1.2.1 NewCustomer

This stored SQL procedure allows customer service to enter a new customer using a wireless CDPD device to the database. User Id and Password are entered as NULL.

Input:
UserID (varchar[25])
Password (varchar[25])
DeviceAddress (varchar[25])
AccountNo (char[3])
ServiceType (int)

Output:
CustomerID (int)
ReturnCocle (int)—0=Success, 1=Duplicate User ID, 2=Duplicate device address.

1.2.2 DeleteCustomer

This stored SQL procedure allows customer service to delete a customer from the database. This procedure also deletes any devices used by the customer and services provisioned for the customer.

Input:
    CustomerID (int)
Output:
    ReturnCode (int)—0=Success, 1=Invalid customer id.
1.2.3 AddUser
This stored SQL procedure allows customer service to add a user id and password to the database.
Input:
    UserId (varchar[25])
    Password (varchar[25])
    AccountNo (char[8])
Output:
    CustomerID (int)
    ReturnCode (int)—0=Success, 1=Duplicate user id.
1.2.4 DeleteUser
This stored SQL procedure allows customer service to delete a customer from the database. This procedure also deletes any devices used by the customer and services provisioned for the customer.
Input:
    CustomerID (int)
Output:
    ReturnCode (int)—0=Success, 1=Invalid customer id.
1.2.5 Change Password
This stored SQL procedure allows customer service to change a user's password in the database.
Input:
    UserID (varchar[25])
    Password (varchar[25])
Output:
    ReturnCode (int)—0=Success, 1=Invalid UserID
1.2.6 AddUserRight
This stored SQL procedure allows customer service to add a user access right to a customer defined in the database.
Input:
    CustomerID (int)
    ServiceType (int)
Output:
    ReturnCode (int)—0=Success, 1=Invalid customer id, 2=Duplicate entry
1.2.7 DeleteUserRight
This stored SQL procedure allows customer service to delete a user access right from a customer defined in the database.
Input:
    CustomerID (int)
    ServiceType (int)
Output:
    ReturnCode (int)—0=Success, 1=Invalid customer id, 2=Invalid user right for the customer.
1.2.8 AddDevice
This stored SQL procedure allows customer service to associate a device address to a defined customer in the database.
Input:
    DeviceAddress (varchar[25])
    Wireline (bit)—0=client, 1=wireline.
    CommType (smallint)–1=CDPD, 2=Mobitex, 3=ISP Dial up
    CustomerID (int)
    Token (int)
Output:
    ReturnCode (int)—0=Success, 1=Bad parameter, 2=Duplicate device address,
    3=invalid customer id, 4=Customer already has device address.

1.2.9 DeleteDevice
This stored SQL procedure allows customer service to delete a device address from a defined customer in the database.
Input:
    DeviceAddress (varchar[25])
Output:
    ReturnCode (int)—0=Success, 1=Device address not found
1.2.10 DeleteDepiceByCustID
This stored SQL procedure allows customer service to disassociate by deletion of ALL device addresses from a defined customer in the database.
Input:
    CustomerID (int)
Output:
    ReturnCode (int)—0=Success, 1=No device address(es) to delete.
1.2.11 SuspendUser
This stored SQL procedure allows customer service to suspend a user and all the user's device address' access to the intelligent messaging network and notify all MRs 124 to remove the device address from it's local cache. This mechanism is used when a customer reports a lost or stolen client device.
Input:
    CustomerID (int)
Output:
    ReturnCode (int)—0=Success
1.2.12 ReadivateUser
This stored SQL procedure allows customer service to reactivate a user and all the user's device address' access to the intelligent messaging network.
Input:
    CustomerID (int)
Output:
    ReturnCode (int)—0=Success.
1.2.13 SuspendDevice
This stored SQL procedure allows customer service to suspend a device address' access to the intelligent messaging network and notify all MRs 124 to remove the device address from it's local cache.
Input:
    DeviceAddress (varchar[25])
    NotifyAMR 24 (bit) True to suspend the device address from all MRs 124 memory, false not to.
Output:
    ReturnCode (int)—0=Success, 1=Error creating Server Manager, 2=Error calling Server Manager.
1.2.14 ReactivateDevice
This stored SQL procedure allows customer service to reactivate a device address' access to the intelligent messaging network.
Input:
    DeviceAddress (varchar[25])
Output:
    ReturnCode (int)—0=Success.
1.2.15 GetCustomerID
This stored SQL procedure allows customer service to get the customer identifier associated with a device address.
Input:
    DeviceAddress (varchar[25])
Output:
    CustomerID (int)
    ReturnCode (int)—0=Success, 1=Device address not found.

IV. HTTP Proxy Back End Server

Most industry standard browsers support the ability to be configured to access the Internet via a proxy server instead of communicating directly with an HTTP Web Server. The Intelligent messaging network HTTP Proxy Back End Server 132 is responsible for handling incoming HTTP requests, sending the request over the Internet to the target Web HTTP Server, and transmitting the response back to the client device. The Intelligent messaging network HTTP Proxy Back End Server 132 supports various versions of the HTTP protocol specification. The HTTP Proxy Back End Server 132 is also responsible for communicating with a target HTTP Web Server. In order to handle each inbound HTTP request, the HTTP Proxy Back End Server 132 creates and manages a TCP/IP socket connection to the target Web HTTP Server. When the HTTP Proxy Back End Server 132 receives the response from the Web HTTP Server, it creates an HTTP response message and formats it for transmission back to the client application running on a client device.

V. HTTP Redirector

Browsers 104 can typically communicate directly to an HTTP Web Server via TCP/IP. TCP/IP, however, is a chatty LAN protocol requiring significant overhead that is not a cost effective way for browsing the Internet wirelessly. According to one embodiment of the invention, an HTTP Redirector 106 can intercept raw HTTP requests from the browser 104 and can redirect the request over the intelligent messaging network for fulfillment by an HTTP Proxy Back End Server 132. When the HTTP Redirector receives a response from the HTTP Proxy Back End Server 132, it can simply pass the response to the browser 104 to process.

Figure 2:
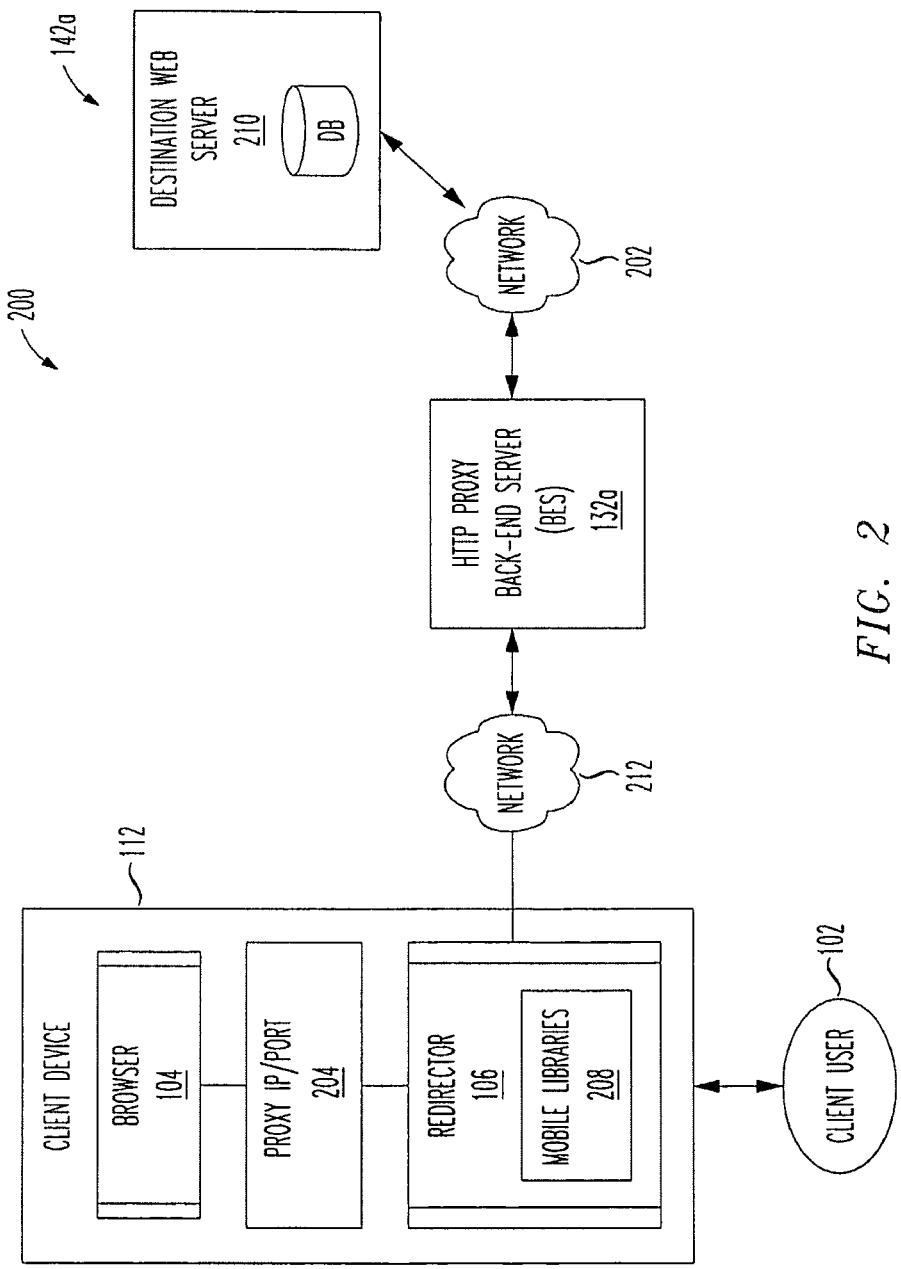
FIG. 2 is a block diagram of an exemplary embodiment of a redirector that interacts with a browser and the intelligent messaging network that is part of the system of FIG. 1A.

FIG. 2 illustrates a block diagram 200 of an exemplary embodiment of the present invention. Block diagram 200 illustrates an HTTP Redirector 106 interacting with the browser 104 and intelligent messaging network network. The HTTP Redirector 106 can act as a "client side" proxy server allowing it to intercept Web browser HTTP requests. When communicating over the wireless network, the HTTP Redirector 106 can take advantage of the optimized wireless protocol and compression services offered by the Intelligent messaging network and the protocol of the present invention. This results in significant byte savings when sending HTTP requests and receiving HTTP responses over a wireless network. In the exemplary embodiment, the HTTP Redirector can support browsers 104 such as, e.g., Microsoft's Internet Explorer 4.0 and Netscape's Communicator 4.5 browsers on the Windows 95, 98, NT, 2000 and Windows CE platforms.

As mentioned above, browsing the Internet using a standard version of a conventional browser 104 is not ideal in a wireless environment. Standard versions of browsers 104 send HTTP requests over TCP/IP, which is a chatty LAN protocol. TCP/IP is not cost effective in terms of bandwidth usage in a wireless environment Furthermore, a standard version of browser 104 can require an IP based network and conventionally does not work with non-IP based wireless networks such as Mobitex. The redirector 106 can address these issues and can provide a method of using a standard Web browser 104 in a wireless network.

Referring to FIG. 2, in an exemplary embodiment, browser 104 of a client device 112 can typically allow access to resources such as, e.g., a destination Web server 210, such as an Internet server 142a on a network 202, such as, e.g., the global Internet, through a Proxy IP/port 204 instead of communicating directly with the destination Web server 210. In the environment of the present invention, the Proxy IP/port 204 can fulfill a request on behalf of the client device 112 to the destination Web server 210. The redirector 106 can act as a "client-side" proxy. The HTTP Redirector 106 can sit on top of standard mobile libraries 208 provided by the intelligent messaging network. These mobile libraries 208 can be optimized for the specific wireless protocol supported by the specific client device 112a-c.

The HTTP Redirector 106 can intercept all requests from browser 104. The raw HTTP request can then be packaged into an intelligent messaging network message and transmitted through the intelligent messaging network 114 to the BES 122a-c designed to handle HTTP requests.

The HTTP BES 132 can forward the request to a Web server of a content provider such as, e.g., destination web server 210, which can provide a response. The content provider can be a third party in an exemplary embodiment. The communication to the content provider can occur via the network 202 of FIG. 2. A network 212 depicted in FIG. 2 can include the intelligent messaging network of the present invention, e.g., the underlying LAN network 118a and b, the PGs 116, the firewall 120, router 110, and the MR 124.

When the HBES 132 receives the response from the destination Web server 210, HBES 132, or BES 122 (not shown), can package the response into an intelligent messaging network message and can transmit the response back to the requesting client device 112 via the PG 116 via the MR 124.

When the message arrives at the client device 112, it can be passed up to the redirector 106 where the message can be unpacked from its intelligent messaging network format into an HTTP response and can be sent to the browser 104. The HTTP redirector 106 can maintain all connections with the browser 104 throughout this process, so that from the perspective of the browser 104, the browser 104 appears to be communicating directly to the Web server 210.

The mobile libraries 208 can be optimized for the underlying wireless protocol. The HTTP Redirector 106 can sit on top of the libraries 208 providing the browser 104 with the same benefits without any modifications to the browser 104. Since the HTTP Redirector 106 packages HTTP requests and responses into intelligent messaging network messages, the raw payload of the messages can be compressed. Most conventional Web traffic deals with straight text in the form of HTML, so the amount of data transmitted can be greatly reduced by using standard compression techniques. The compression techniques can result in an increase in data throughput and a reduction of airtime.

In addition to compression, in an exemplary embodiment, performance can be enhanced by the fact that TCP/IP is not used over the wireless network, where the SNTL transport protocol of the present invention is rather used.

Figure 3:
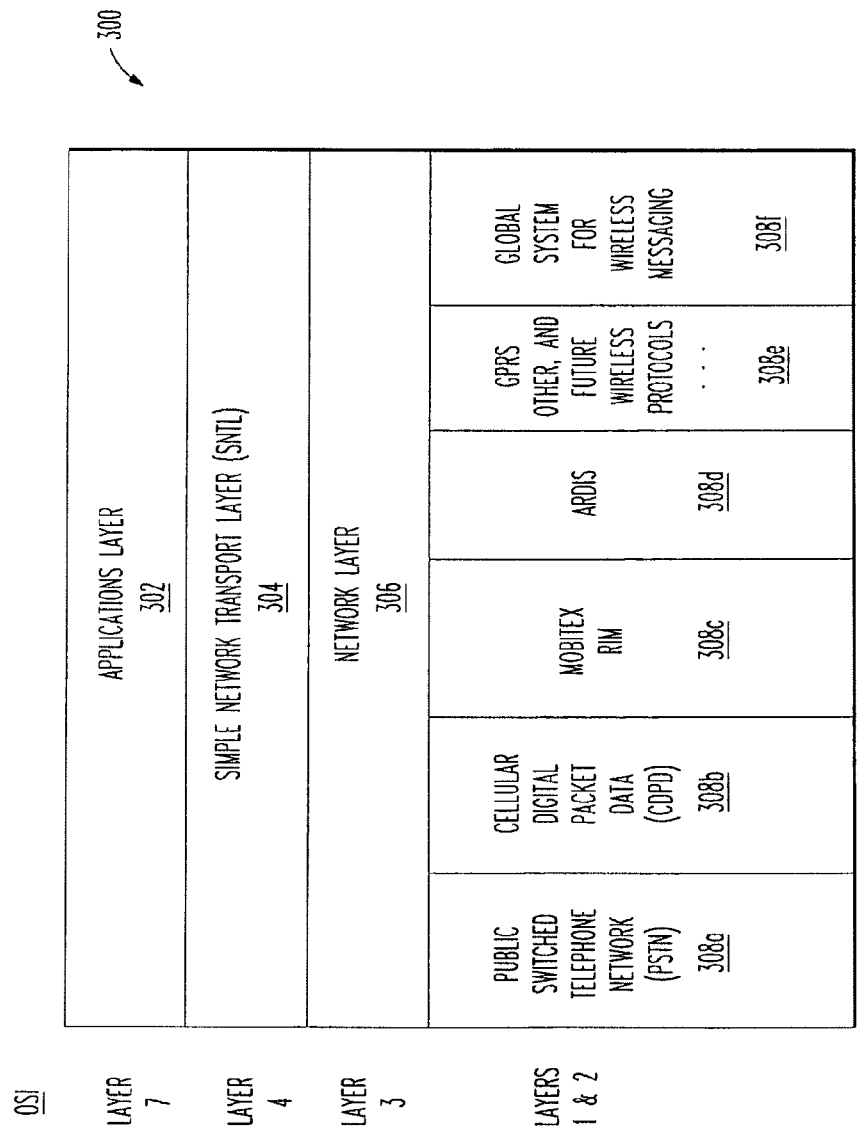
FIG. 3 depicts an exemplary embodiment of the proprietary protocol stack of the present invention.

Turning briefly to FIG. 3, an exemplary embodiment of a network communications layered architecture is depicted. FIG. 3 includes block diagram 300, which is described further below following the description with reference to FIG. 8A.

VI. Message Flow

The flow of any messages within the network can include authentication by the MR 124 via authentication challenge success, failures, client application request to BES 122, BES 122 response to client application, and BES 122 alert to client application.

Figure 4:
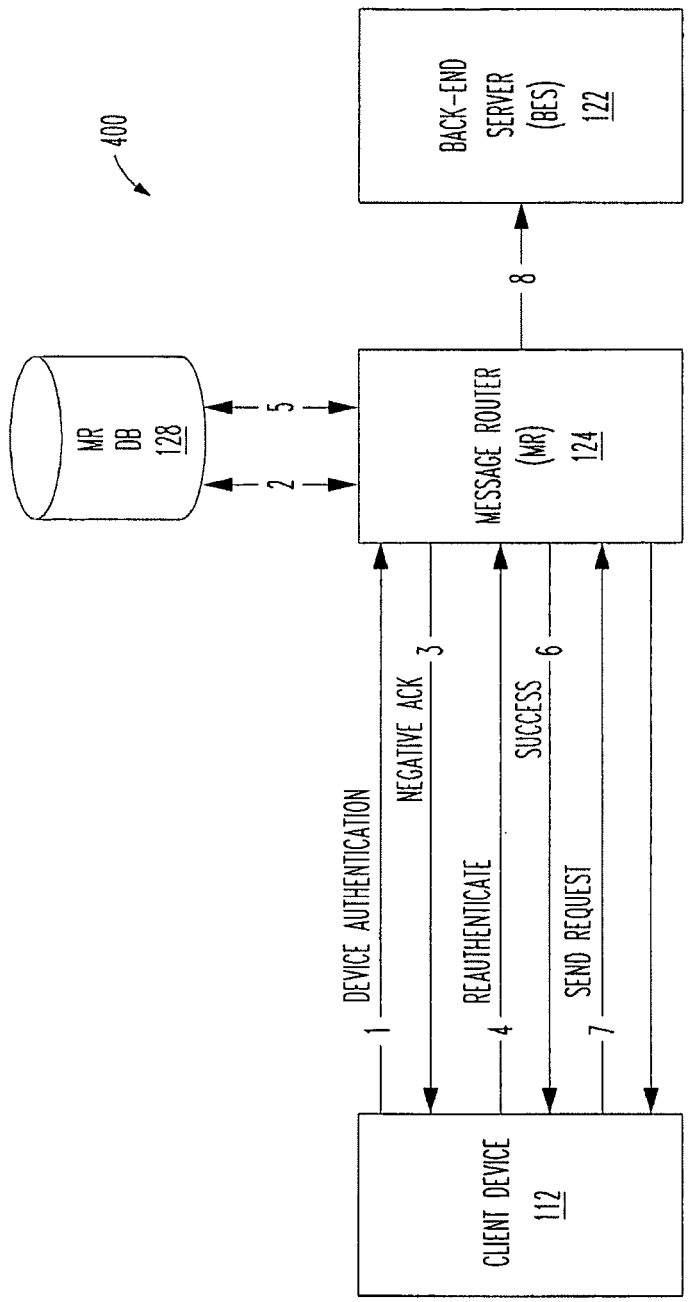
FIG. 4 is an exemplary embodiment of a flow diagram numerically depicting a flow of messages that corresponds to an authentication challenge success.

FIG. 4 illustrates a flow diagram 400 depicting an exemplary embodiment of the present invention. Flow diagram 400 numerically depicts a flow of messages that corresponds to the authentication challenge success flow. Flow diagram 400 numerically shows message paths between a client device 112 and an MR 124 including exemplary steps labeled by numbers 1-8, as follows:

1. The client application can send an application request message to the MR 124 (the PG 116 is not explicitly involved in authentication), i.e., a device authentication;
2. The client application running on a client device may fail the authentication of the MR 124;
    There are several ways a client application running on a client device can fail authentication. The MR 124 cannot find the device address in its local cache or the AuthorizedDevices table in the intelligent messaging network MR database 128. The device's security token in the LinkStationID is not the same as the device's security token in the intelligent messaging network MR database 128. The subscriber does not have user rights to the requested service.
3. The MR 124 can send a a negative acknowledgment (NACK) message to the client application with the appropriate error code;
4. The client application can respond with an authentication request message including an UserID, secure password, and the requested service type to authenticate; i.e., reauthentication;
5. The MR 124 can check the UserID and password against the AuthorizedUsers in the MR DB 128;
    If the UserID/password are valid, the MR 124 can verify that the subscriber has rights to the requested service. If the subscriber does have user rights to the service, the MR 124 can add the device address to the AuthorizedDevices table, as well as to the MR 124 local cache and can assign a security token to the client application running on the client device 112.
6. The MR 124 can send an authenticated response message with a success value to the client application to let the client application know that the client application has been authenticated; the security token can also be sent to the client device 112; i.e., an indication of success;
7. The client application can re-send the original message (step 1) that caused the authentication challenge with the new security token; i.e., send request; and
8. The MR 124 can verify the device address against the authentication cache of the MR 124 and can forward the message to the proper BES 122 or HBES 132 (not shown).

Figure 5:
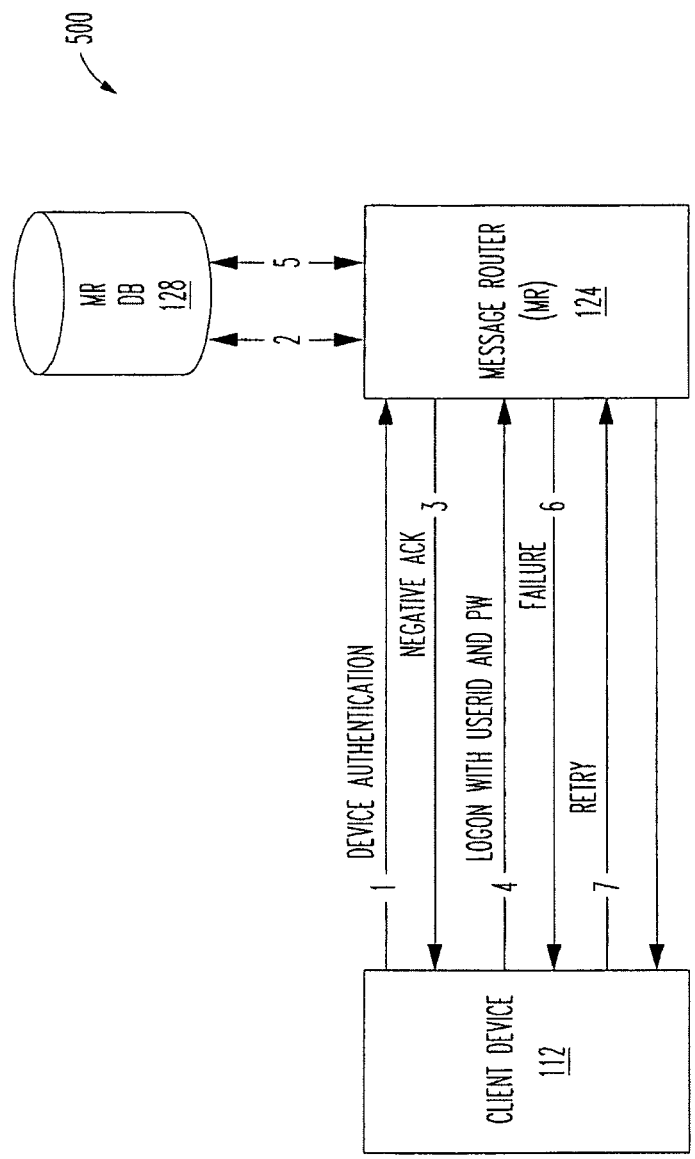
FIG. 5 is an exemplary embodiment of a flow diagram numerically depicting a flow of messages that corresponds to an authentication challenge failure.

FIG. 5 illustrates a flow diagram 500 depicting an exemplary embodiment of the present invention. Flow diagram 400 numerically depicts a flow of messages that can correspond to the authentication challenge success/failure. The diagram numerically shows message paths between the client device 112 and the MR 124 including exemplary steps labeled by numbers 1-7, as follows:

1. Client application can send an application message to the MR 124 (again, the PG 116 is not explicitly involved in authentication, in an exemplary embodiment, all client/MR 124 communications can pass through the PG 116); i.e., device authentication;
2. The client device 112 can fail the MRs 124 authentication;
    There are several ways a device can fail authentication. For example, the MR 124 cannot find the device address in its local cache or the AuthorizedDevices table in the intelligent messaging network MR database 128. The security token of the client device 112 in the LinkStationID can be not the same as the device's security token in the intelligent messaging network MR database 128. The user of the client device 112 can not have user rights to the requested service.
3. The MR 124 can send a negative acknowledgment (NACK) message to the client application with the appropriate error code;
4. The client application can respond with an authentication request including the UserID, secure password and the requested service type to authenticate; i.e., logon with userid and password;
5. The MR 124 can check the UserID and password against the AuthorizedUsers in the MR DB 128; the UserID, password can be invalid and/or the user can not have rights to the requested service;
6. The MR 124 can send an authentication response message with a failure value to the client application to let it know that the authentication has failed; i.e., authentication failure; and
7. The client may choose to prompt the client user 102, e.g., to re-enter the UserID and password and repeat the flow diagram 500 starting from step 4; i.e., retry.

Figure 6A:
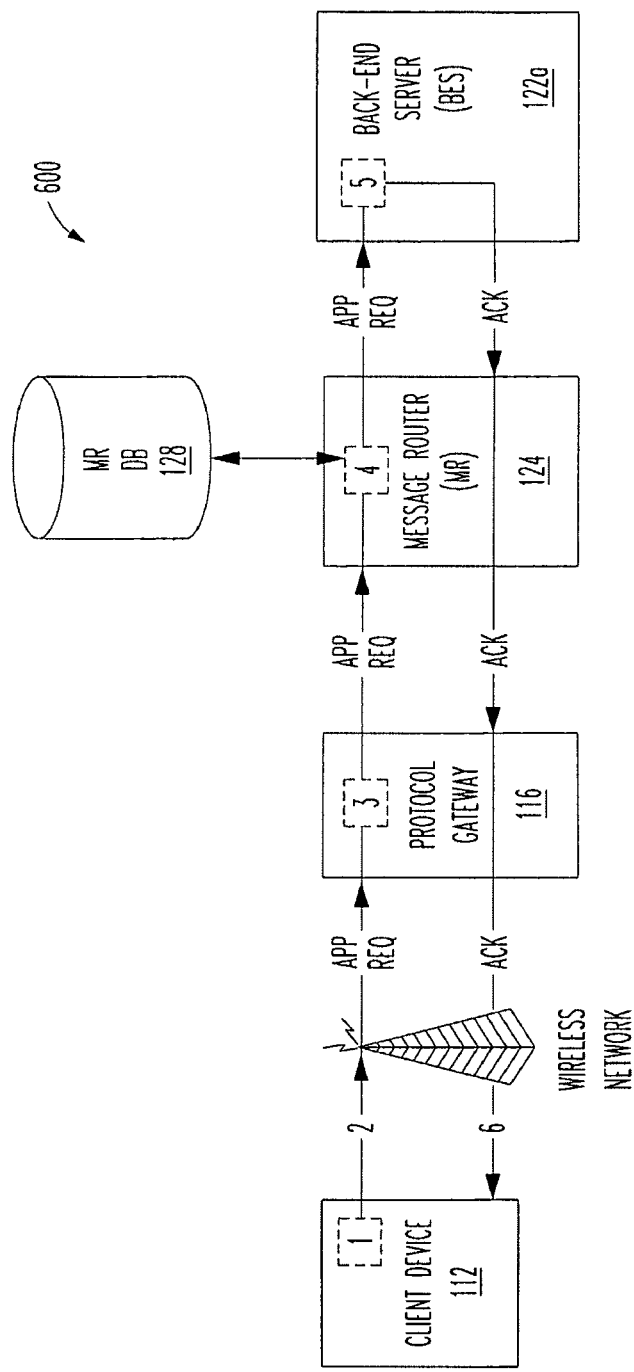
FIG. 6A is an exemplary embodiment of a flow diagram numerically depicting a flow of messages that corresponds to a client application request to Back-End Server.

FIG. 6A illustrates a flow diagram numerically depicting a flow of messages that corresponds to a client application request to BES 122. The diagram numerically shows message paths between the client device 112 and the MR 124 including exemplary steps labeled by numbers 1-6, as follows:

1. The client application that can be running on client device 112 can create an application request (APP REQ) message and can pass the message to the transport layer to transmit over the network 212;
2. The transport layer can determine if the message needs to be segmented into multiple segments; the transport layer can transmit the message over the network and can wait for a transport level ACK;
3. Upon receiving the APP REQ message, the PG 116 can assemble the message segment into a complete application message (if necessary) and can send the application message to the next available MR 124;
    If no MR 124 is available, a NACK message can be generated by the PG 116 and can be sent back to the client application with the appropriate error code. Preferably, the PG 116 can not immediately send a transport ACK message back to the client application. This can be done when the BES 122 receives the application message and sends an ACK control message back to the PG 116.
4. The MR 124 can look up the device address and the service type (first in its local cache, then if necessary in the intelligent messaging network MR DB 128) to see if the message is from an authorized source;
    If the message is from an authorized source, the MR 124 can choose the next available BES 122 that has been registered to support the specified service type and can then send the message to that BES 122. If there are no BESs 122 registered that can support the specified service type, a NACK message can be generated by the MR 124 and can be sent back to the client application with the appropriate error code.
5. Upon receiving the application message from the MR 124, the BES 122 can send an acknowledgement (ACK) control message back to the PG 116 that received the application message; the BES 122 can also process the incoming message; and
6. Upon receiving the ACK control message from the BES 122, the PG 116 can send a transport ACK message to the client application at client device 112; in some exemplary embodiments, sending ACK messages can be optional.

Figure 6B:
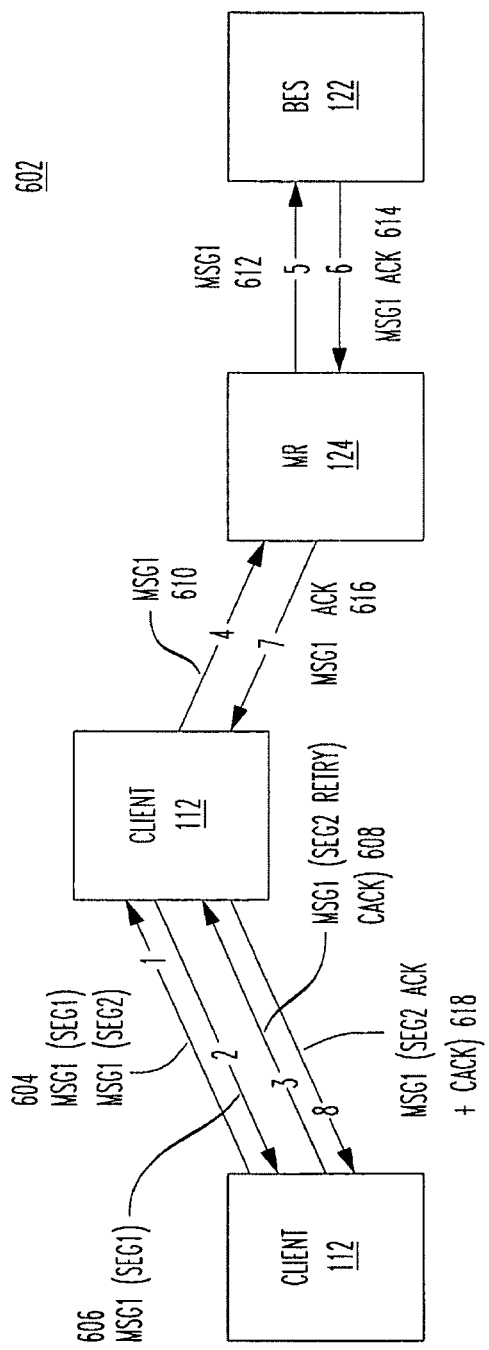
FIG. 6B is an exemplary embodiment of a flow diagram numerically depicting a flow of multi-segment messages that corresponds to a client application request to a Back-End Server.

FIG. 6B depicts an exemplary embodiment of a message flow diagram 602 illustrating transmission of a multi-segment message from a client device 112 to a BES 122 according to the present invention. Flow diagram 602 can begin with step 604.

In step 604, the simple network transport layer (SNTL) application can segment the message into multiple segments, can encapsulate the segments with an SNTL segment header 900, and can transmit the message initially to PG 116. An exemplary embodiment of a message header 900 is illustrated below with reference to FIG. 9. As will be apparent to those skilled in the relevant art, due to a high bit error rate in wireless communication links, it can be expected that not all transmissions to PG 116 will be received from the client device 112. From step 604, the flow diagram can continue with step 606.

In step 606, the PG 116 can send to client device 112 an acknowledgement (ACK) of receipt of the transmitted messages at the PG 116. As shown, in the exemplary embodiment, receipt of only segment 1 is acknowledged. Receipt of segment 2 is not acknowledged. From step 606, the flow diagram 602 can continue with step 608.

In step 608, in an exemplary embodiment, client device 112 can automatically retry, or retransmit segment 2 of the message to the PG 116, since acknowledgement was not received for segment 2 in step 604. User datagram protocol (UDP) is an efficient communication protocol, however it is unreliable, lacking provision to segment messages and retransmit unacknowledged messages. In the exemplary embodiment, the peer protocols of the SNTL layers on the client device 112 and PG 116 can work in coordination with UDP to provide highly optimized and reliable wireless communication while using efficient connectionless (i.e., unlike TCP) UDP communication. In an exemplary embodiment, the SNTL layers can provide other useful transport functions such as, e.g., pacing, congestion control and other functionality without requiring an entire TCP transport stack. The SNTL layer can include, in an exemplary embodiment, a 4 bytes wide header, 6 bytes wide for multi-segment messages, as discussed with reference to FIG. 9. From step 608, flow diagram 602 can continue with step 610.

In step 610, PG 116 can transmit the complete multi-segment message to MR 124. From step 610, flow diagram 602 can continue with step 612.

In step 612, MR 124 can route the message to BES 122 as discussed above with reference to FIG. 1C. From step 612, flow diagram 602 can continue with step 614.

In step 614, BES 122 can send an acknowledgement of receipt of the multi-segment message to MR 124. From step 614, flow diagram 602 can continue with step 616.

In step 616, MR 124 can send acknowledgement of receipt of the multi-segment message at the BES 122 on to PG 116. From step 616, flow diagram 602 can continue with step 618.

In step 618, PG 116 can send acknowledgement of receipt of the multi-segment message at the BES 122 on to client device 112. PG 116 can also send acknowledgment of receipt of segment 2 of the message as well. In one exemplary embodiment acknowledgment of receipt of the second segment can occur following step 606. From step 618, flow diagram 602 can immediately complete.

Figure 7A:
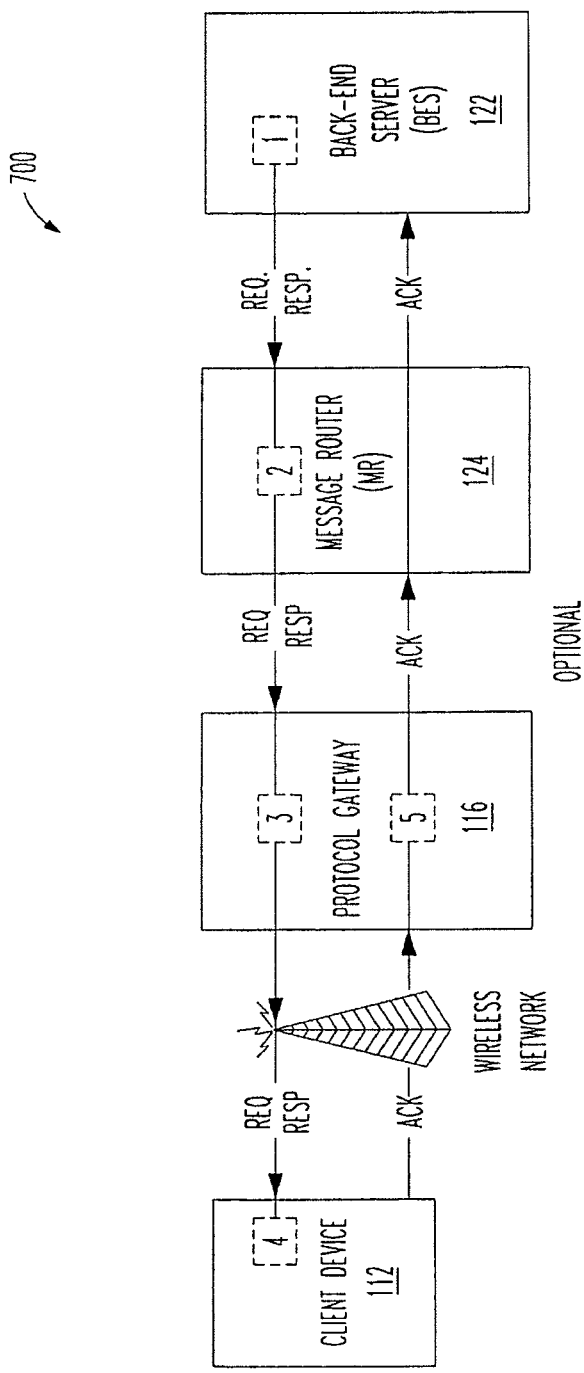
FIG. 7A is an exemplary embodiment of a flow diagram numerically depicting a flow of messages that corresponds to a Back-End Server response to client application.

FIG. 7A illustrates a flow diagram 700 of an exemplary embodiment of the present invention. Flow diagram 700 numerically depicts a flow of messages that corresponds to a response from BES 122 to a request of the client application, illustrated and described further above with reference to FIG. 6A. Flow diagram 700 numerically shows message paths beginning from the BES 122, through the MR 124 and PG 116 to client device 112 including exemplary steps labeled by numbers 1-5, as follows:

1. A BES 122 can respond to a client application request as illustrated in flow diagram 600; the BES 122 can pass the response message (REQ RESP), message flags, customer ID and LinkStationID (cached from the previous incoming request) in flow diagram 700, which can represent a second or so-called "send" call;
   Message flags can specify whether to compress and/or encrypt the message and whether the BES 122 requires an ACK message when the PG 116 has successfully delivered the application message to the client application running on client device 112. The BES 122 can send the application message to the next available MR 124. If no MR 124 is available, then a false can be returned from the send.
2. The MR 124 can use the LinkStationID to determine the associated communication type (e.g., CDPD, Mobitex, etc.) and can send the message to the next available PG 116 of the correct communication type;
3. The PG 116 can segment the application message (if necessary) and can transmit the application message over the network;
4. The transport layer can receive the message segment and can assemble the message segment into a complete application message (if necessary); the transport layer can send a transport ACK message to the PG 116 that sent the message; it is important to note that, in some exemplary embodiments, sending ACK messages can be optional; and
5. When the PG 116 receives the transport ACK from the client application, the PG 116 can send an ACK control message back to the BES 122 (via the MR 124) that was the source of the original message (if required).

Figure 7B:
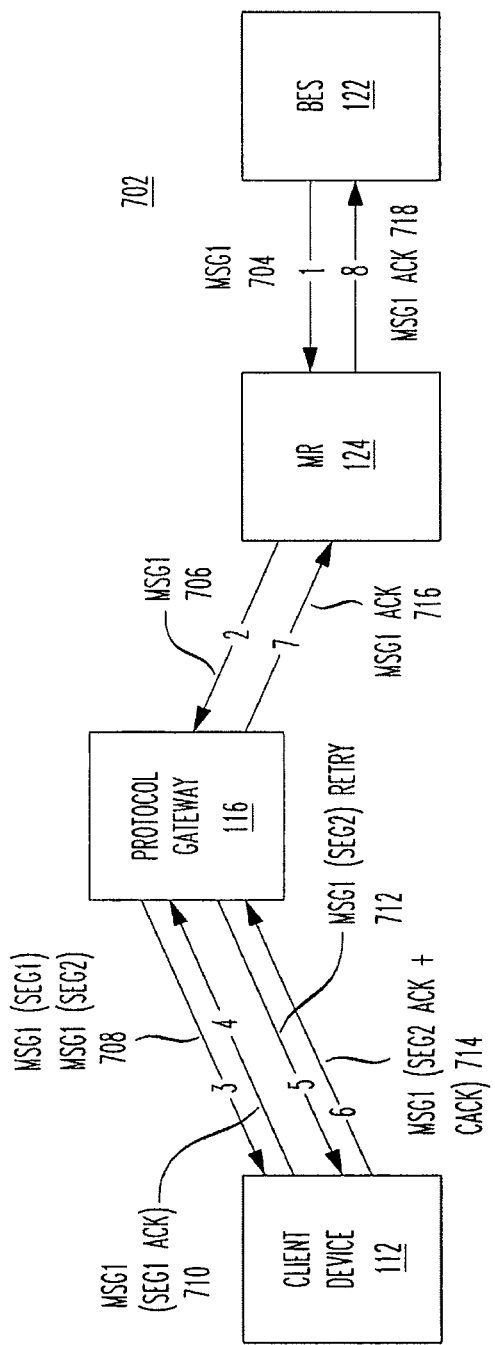
FIG. 7B is an exemplary embodiment of a flow diagram numerically depicting a flow of multi-segment messages that corresponds to a Back-End Server (BES) response to client application, or alternatively an alert generated by the BES.

FIG. 7B depicts an exemplary embodiment of a message flow diagram 702 illustrating transmission of a multi-segment message from BES 122 to a client device 112 according to the present invention. Flow diagram 702 can alternatively represent sending of a multi-segment alert from BES 122 to a client device 112. Flow diagram 702 can begin with step 704.

In step 704, BES 122 can transmit a multi-segment message intended for a client device 112 to MR 124: From step 704, flow diagram 702 can continue with step 706.

In step 706, MR 124 can route the message to an appropriate PG 116 as discussed above with reference to FIG. 1C.

In step 708, the simple network transport layer (SNTL) application running on the PG 116 can segment the message into multiple segments, can encapsulate the segments with an SNTL segment header 900, and can transmit the segments of the message to the client device 112. An exemplary embodiment of a message header 900 is illustrated below with reference to FIG. 9. As will be apparent to those skilled in the relevant art, due to a high bit error rate in wireless communication links, it can be expected that potentially not all transmissions from PG 116 will be received at the client device 112. From step 708, the flow diagram can continue with step 710.

In step 710, client device 112 can send to the PG 116 an acknowledgement (ACK) of receipt of the transmitted messages at the client device 112. As shown, in the exemplary embodiment, receipt of only segment 1 is acknowledged. Receipt of segment 2 is not acknowledged. From step 710, the flow diagram 702 can continue with step 712.

In step 712, in an exemplary embodiment, PG 116 can automatically retry, or retransmit segment 2 of the message to the client device 112, since acknowledgement of receipt was not received for segment 2 in step 710. From step 712, flow diagram 702 can continue with step 714.

In step 714, client device 112 can transmit the complete multi-segment message to PG 116. From step 714, flow diagram 702 can continue with step 716.

In step 716, PG 716 can send an acknowledgement of receipt of the multi-segment message to MR 124. From step 716, flow diagram 702 can continue with step 718.

In step 718, MR 124 can send acknowledgement of receipt of the multi-segment message at the client 112 on to the BES 122. From step 718, flow diagram 702 can immediately end.

The flow diagram 702 can be used in one exemplary embodiment to send a response from BES 122 to a request originating from client 112. In another exemplary embodiment, flow diagram 702 can be used to generate an unsolicited response, also commonly referred to as an "alert," or a "push." It is important to note that acknowledgement of receipt of a response message, as shown for example in flow diagram 702, is optional. For example, in the case of some client devices 112, such as, e.g., with some paging devices, it may be impossible to send back from the client devices 112 an acknowledgment.

Figure 8A:
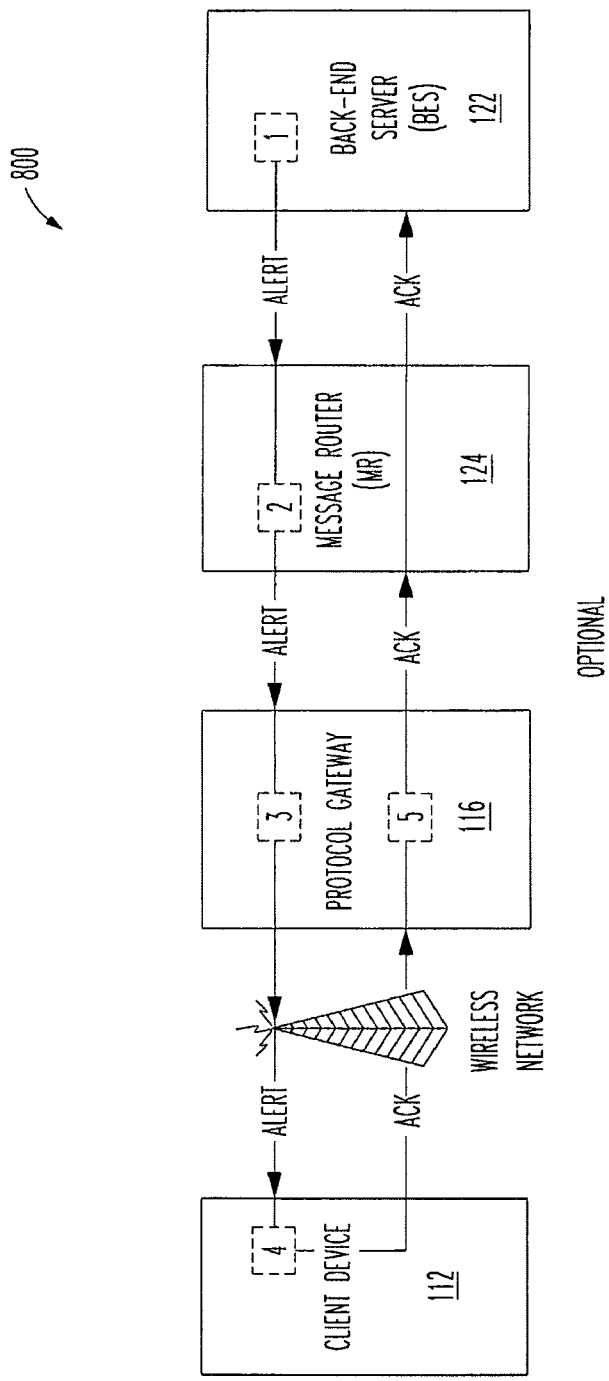
FIG. 8A is an exemplary embodiment of a flow diagram numerically depicting a flow of messages that corresponds to a Back-End Server alert to client application.

FIG. 8A illustrates a flow diagram 800 depicting an exemplary embodiment of the present invention. Flow diagram 800 numerically depicts a flow of messages that corresponds to an alert that can be sent from a BES 122 to a client application at client device 112. Flow diagram 800, in an exemplary embodiment, can proceed similarly to the method detailed in flow diagram 700 above describing sending a response message to a request. A BES 122 unsolicited alert can be sent to client application and can differ only slightly from the response from BES 122 to a client application flow. The difference can include that the response message to a request is given the client device 112 object information when the BES 122 receives the request and can use this object to send the response. In an exemplary embodiment, the object information can include a hidden linkstation id. When a BES 122 sends an alert, the BES 122 is responsible for constructing the client device 112 object information with the proper Customer ID and Device ID. The linkstation id that is hidden may be null. However the BES 122 can know the customer ID or the customer ID and the port number of the client application running on client device 112. The BES 122 can know only about the customer id and device id. The device id can be set to the defined ALL_DEVICES value. In one embodiment, the port number of the client application is not needed. By setting the customer id and device id, the BES 122 can target a specific client device 112. If the device id is set to ALL_DEVICES, then the message should be sent to all of the customer's devices 112. Flow diagram 800 of FIG. 8 numerically shows an exemplary alert message flow from the BES 122 through MR 124, and PG 116 to the client application running on the client device 112 including several exemplary steps labeled by numbers 1-5, as follows:

1. A BES 122 can send an unsolicited alert to a client application. The BES can pass the client device 112 information object, the alert message, the message send flags, (ACK_REQUIRED, SEND_IF_ACTIVE_ONLY, SEND_ONLY_ONCE), compression flag, and encryption flag on the send call.

The customer/application information can include the customer II) or the customer ID and the port number of the client application running on client device 112. Message flags can specify whether to compress and/or encrypt the message and whether the BES 122 requires an ACK message when the PG 116 has successfully delivered the message to the client application. The BES 122 can then send the alert message to the next available MR 124. If no MRs 124 are available, then a false can be returned from the send call. The client device 112 information object can include the customer id and device id. Device id can be set to define the value of ALL_DEVICES if the BES 122 wants to send the alert to all devices 112 owned by the customer. Or the BES 122 can specify a specific device id if the BES 122 wants to target a specific customer's device 112. Message flags can specify 1) whether the BES 122 requires an ACK message when the PG 116 has successfully delivered the message to the client application (ACK_REQUIRED), 2) that the intelligent messaging network only try sending the alert if the client is active on the intelligent messaging network (SEND_IF_ACTIVE_ONLY), 3) that the PG 116 should only try sending the message once and not perform retries (SEND_ONLY_ONCE). The compression flags can indicate if the message needs to be compressed or not and if so what algorithm to use. The encryption flags can indicate if the message needs to be encrypted or not and if so what encryption algorithm to use.

2. The MR 124 can use the customer/application information to send the alert message.

In particular, the MR 124 can use the customer id and device id information to send the alert message.

If the customer/application information includes only the customer ID, then the MR 124 can search the local cache of the MR 124 and can search the ActiveUsers table to obtain the LinkStationID associated with the customer ID. If the customer/application includes both the customer ID and application port number then the MR 124 can search the local cache of the MR 124 and can search the first device assigned to the customer ID in the AuthorizedDevices table to obtain the LinkStationID. The MR 124 can use the LinkStationID to determine the associated communication type (e.g., CDPD, Mobitex, etc.) and can send the message to the next available PG 116 of the correct communication type. If the customer/application information includes only the customer ID and the LinkStationID and these are not found in the local cache or ActiveUsers table, the MR 124 cannot send the outgoing message to the client application, in an exemplary embodiment. Therefore the MR 124 can send a customer inactive message back to the BES 122 that was the source of the outgoing message. IF the customer/application information is both the customer ID and port number of the client application running on client device 112, then the message can always be sent if a device address is found in the AuthorizedDevices table for the customer ID. In an exemplary embodiment, the linkstation id in the client device information is null so the MR 124 will use the customer id and device id to construct one or more linkstation id(s). The following are 4 exemplary scenarios. 1) If the message send flag is set to SEND_IF_ACTIVE_ONLY and device id is specified, then the MR 124 can first look in its local cache to obtain the linkstation id of the specified device. If the device, is not found in its local cache, then the MR 124 can look in the ActiveUsers table to obtain the linkstation id of the customer's device 112, (the device 112 could be active within the intelligent messaging network on some other MR 124) 2) If the message send flag is set to SEND_IF_ACTIVE_ONLY and device id is set to ALL_DEVICES, then the MR 124 can look in the ActiveUsers table to obtain the linkstation id's of all the customer's devices 112 active on the network. 3) If the message flag is not set to SEND_IF_ACTIVE_ONLY and the device id is specified, then the MR 124 can first look in its local cache to obtain the linkstation id of the specified device 112. If the device 112 is not found in, its local cache, then the MR 124 can look in the AuthorizedDevices table to obtain the linkstation id. 4) If the message flag is not set to SEND_

IF_ACTIVE_ONLY and the device id is set to ALL_DEVICES, then all of the customer's device(s) 112 information should be retrieved from the AuthorizedDevices table. Using the retrieved information, the MR 124 can construct the linkstation id(s). If the device(s) are found, either from the cache or database, the MR 124 can use the Linkstation id of each device to determine the associated communication type (e.g., CDPD, Mobitex) and can send the message for each linkstation id(s) to the next available PG 116 of the correct type. If no device(s) are found, the MR 124 can send a customer inactive message if the send message flag is set to SEND_IF_ACTIVE_ONLY otherwise the MR can send a customer not valid message back to the BES 122 that was the source of the alert message.

Figure 8B:
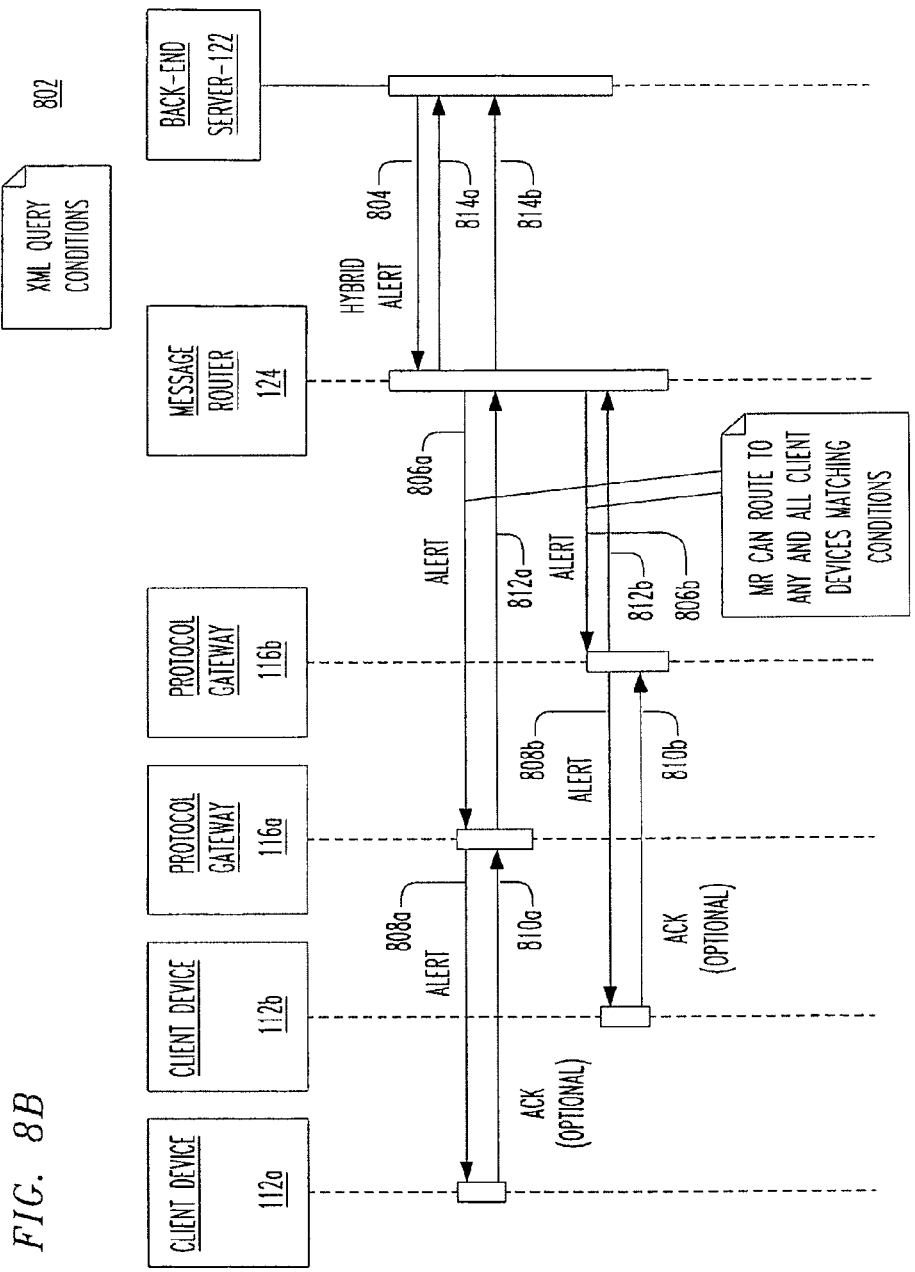
FIG. 8B is an exemplary embodiment of a flow diagram depicting a flow of messages providing an exemplary hybrid alert to an alternate client device according to the present invention.
Figure 8C:
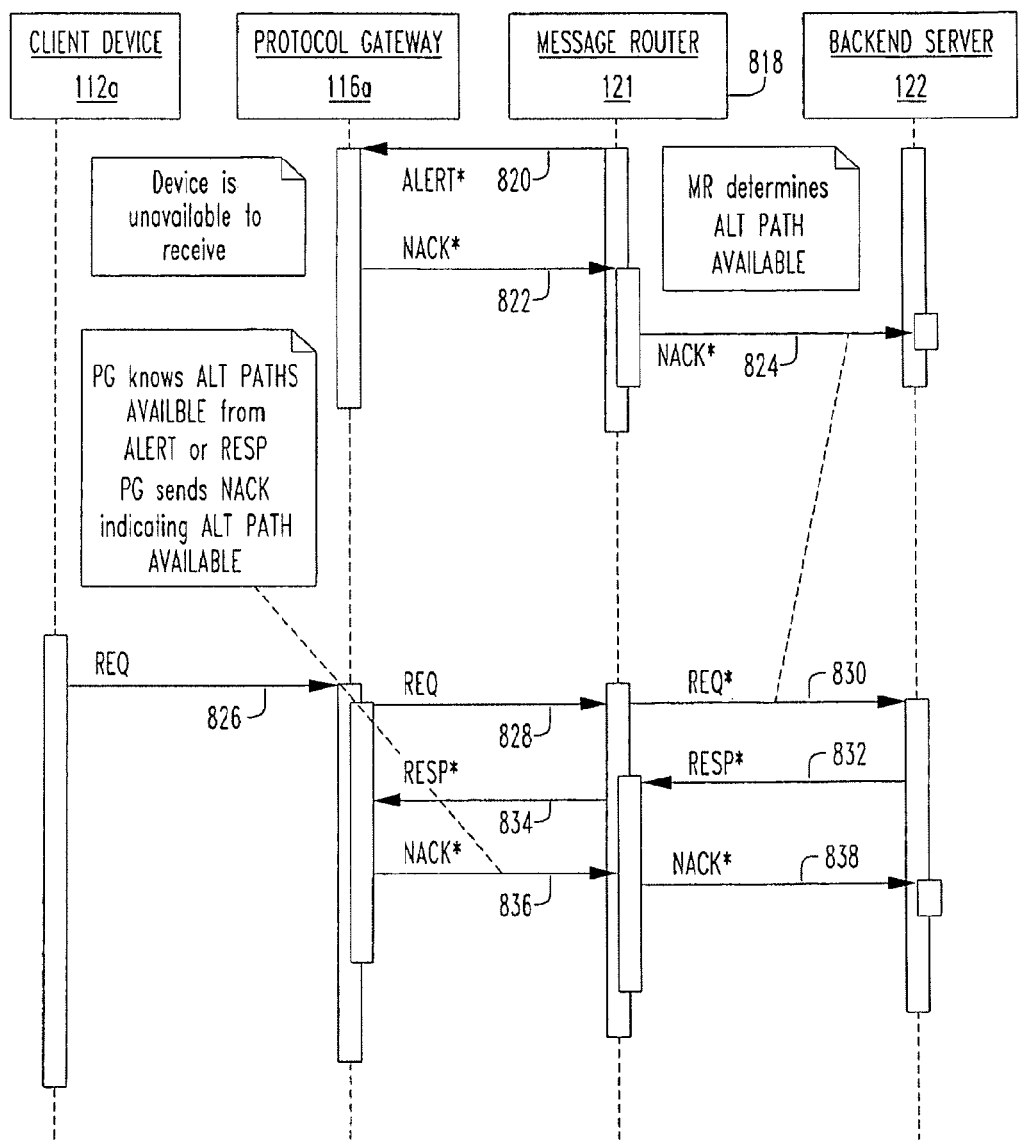
FIG. 8C is an exemplary embodiment of a flow diagram depicting a flow of messages representing an exemplary request and alert that could give rise to sending of a hybrid alert according to FIG. 8B according to the present invention.

If ALL_DEVICES is set for the device id, then once the MR 124 has found all the devices for a particular customer, the MR 124 can send back to the BES 122 each of the device id's found (to correlate the ACK's) before it sends the alert message to the PG 116. The reader is directed to FIG. 8B depicts an exemplary hybrid alert for sending to one or more devices and FIG. 8C depicts an example of negative acknowledgments of an alert and a response providing client device 112 availability back to the BES 122.

3. The PG 116 can segment the alert (if necessary) and can transmit the alert over the network (see FIG. 6B for more information regarding multiple segment responses or alerts);

4. The transport protocol layer can receive the message segment and can assemble the message segment into a complete alert (if necessary); the transport protocol layer can send a transport ACK message to the PG 116 that sent the message; it is important to note that, in some exemplary embodiments, sending ACK messages can be optional. Once the transport assembles the message, it can send the message to any applications that are running the transport protocol layer and that have expressed interest in the same type of message as the alert message. Once the message is delivered to the application, the transport can then send the transport ACK to the PG 116 that sent the message. In one embodiment, the transport ACK is preferably sent back to the PG 116, however this can also be optional.

5. The PG 116 can receive the transport ACK from the client application running on client device 112, and can send an ACK control message back to the BES 122 that was the source of the original message (if required).

FIG. 8B depicts an exemplary embodiment of a flow diagram 802 illustrating transmission of a hybrid alert from BES 122 to client devices 112a, 112b. Flow diagram 802 can begin with step 804.

In step 804, BES 122 can send a hybrid alert message to MR 124 for a client user who can have multiple client devices 112a, 112b. In an exemplary embodiment, the hybrid alert can include XML query conditions. The query can query, e.g., the MR. DB 128 to determine the status of particular conditions. For example, the client user could have multiple devices and the client user's client record can indicate that redundant alerts should be sent to all devices at once. Alternatively, the client user's client record could indicate, e.g., that a message should be sent to a primary, or highest priority device first, and if the BES 122 receives no acknowledgement of receipt of the message from the primary device, then a message can be sent to a secondary or lower priority device, and so on, in the event that the client user has multiple client devices. From step 804, flow diagram 802 can continue with step 806a or 806b.

In an exemplary embodiment, the MR 124 can route the hybrid alert message to any of client devices 112 that match the query conditions. In one exemplary embodiment, the hybrid alert message can be sent to all devices 112a, 112b. Suppose the criterion are such that the hybrid alert is to be sent to both client devices 112a and 112b. The hybrid alerts can be sent in parallel or sequentially.

In step 806a, MR 124 can route the hybrid message to PG 116a. From step 806a, flow diagram 802 can continue with step 808a.

In step 806b, MR 124 can route the hybrid message to PG 116b. From step 806b, flow diagram 802 can continue with step 808b.

In step 808a, PG 116a can route the hybrid alert message to client device 112a. From step 808a, flow diagram 802 can continue with step 810a.

In step 808b, PG 116b can route the hybrid alert message to client device 112b. From step 808b, flow diagram 802 can continue with step 810b.

In step 810a, in one embodiment, client device 112a can send back to PG 116a a message acknowledging receipt of the hybrid alert message. Aknowledgment of receipt of an alert can be optional. From step 810a, flow diagram 802 can continue with step 812a.

In step 810b, in one embodiment, client device 112b can send back to PG 116b a message acknowledging receipt of the hybrid alert message. Acknowledgment of receipt of an alert can be optional. From step 810b, flow diagram 802 can continue with step 812b.

In step 812a, in an exemplary embodiment, the PG 116a can forward on the acknowledgement of receipt at the client device 112a to MR 124. From step 812a, flow diagram 802 can continue with step 814a.

In step 812b, in an exemplary embodiment, the PG 116b can forward on the acknowledgement of receipt at the client device 112b to MR 124. From step 812b, flow diagram 802 can continue with step 814b.

In step 814a, in an exemplary embodiment, MR 124 can forward the acknowledgment of receipt on to BES 122.

In step 814b, in an exemplary embodiment, MR 124 can forward the acknowledgment of receipt on to BES 122.

FIG. 8C depicts an exemplary embodiment of a flow diagram 816 illustrating a client device 112a which becomes unavailable when transmissions are being sent to it, which can prompt a hybrid alert to be sent to another client device 112b as shown, e.g., in flow diagram 802 of FIG. 8B. Flow diagram 816 can begin with step 818.

In step 818, BES 122 can attempt to send an alert to MR 124 intended for client device 112a. From step 818, flow diagram 816 can continue with step 820.

In step 820; MR 124 can route the alert to a PG 116a associated with client device 112a. From step 820, flow diagram 816 can continue with step 822.

In step 822, according to the exemplary embodiment, suppose client device 112a is unavailable to receive, and thus a negative acknowledgement of receipt (NACK) can be sent to MR 124. In one embodiment, the PG 116a can be aware that an alternate path can be available, i.e., that another client device 112b with which the BES 122 can communicate. From step 822, flow diagram 816 can continue with step 824.

In step 824, the negative acknowledgement (NACK) of receipt at client device 112a can be forwarded on from the MR 124 to BES 122. BES 122 can be notified in the NACK, in one embodiment, that the BES 122 can send the alert using a hybrid alert such as, e.g., that depicted in flow diagram 802 of FIG. 8B, to reach the client user using client device 112b (not shown in FIG. 8C).

Flow diagram 816 also depicts a request from client device 112a being sent to BES 122 which can begin with step 826.

In step 826, the client device 112a can send a request message to a PG 116a. From step 826, flow diagram 816 can continue with step 828.

In step 828, PG 116a can forward the request on to MR 124. From step 828, flow diagram 816 can continue with step 830.

In step 830, MR 124 can forward the request to BES 122. From step 830, flow diagram 816 can continue with step 832.

In step 832, BES 122 can send a response message intended for client device 112a to MR 124. From step 832, flow diagram 816 can continue with step 834.

In step 834, MR 124 can route the response message to a PG 116a associated with intended recipient, client device 112a. From step 834, flow diagram 816 can continue with step 836.

In step 836, suppose that the PG 116a determines that client device 112a is unavailable to receive a message, so a negative acknowledgment of receipt of the response message at the client device 112a can be sent to MR 124. From step 836, flow diagram 816 can continue with step 838.

In step 838, MR 124 can forward on the NACK message to BES 122 notifying BES 122 that the response message was not received by client device 112a. In an exemplary embodiment, BES 122 can be notified that the client user can be reached using another client device 112b. BES 122 can be notified in the NACK, that the BES 122 can send the response message ding a hybrid alert such as, e.g., that depicted in flow diagram 802 of FIG. 8B, to reach the client user using client device 112b (not shown in FIG. 8C).

VII. Software Development Kits

A. Mobile Client SDK

The Mobile client SDK is comprised of the following set of platform specific libraries. Each of the following exemplary libraries exports an easy to use API:

Utility Library;
Transport Library; and
Security Library.

An exemplary embodiment of the invention, includes a utility library providing compression services. By keeping the transport library independent from both the utility and security implementation details, new compression and security mechanisms can be added without the knowledge of the transport library. The independence eliminates the need to regression test the transport library, as well as all application users of the transport library when adding a new compression or security mechanism. Because the compression and security solutions may not meet the need for all intelligent messaging network enabled applications, when new applications are developed, any specific compression or security requirements of such applications may be accommodated transparent to the transport library individually, on a component basis. By providing wrapper APIs that encapsulate the default implementation of the utility and/or security libraries, developers could choose to write to the wrapper APIs, or directly to the utility and/or security APIs.

1. Utility Library of the Intelligent Messaging Network

The utility library of the intelligent messaging network can provide applications with functions to perform via an easy to use API. The following section summarizes the major functions provided by the utility library.

A. I/O Streaming

Provides functions to assist developers with handling application messages that are streaming in and out (two ways). Serial in and out functions are provided for most of the common data types supported by the target platform. The streaming functions manage the big-endian little-endian issues on behalf of the application.

B. Compression Mechanism

Applications can optionally compress/encode application messages prior to transmitting the message to a target destination. If the encode algorithm determines that it is not optimal to encode the message, the message is not encoded. Also, applications can optionally decode application messages prior to processing the message. In order to determine if a message needs to be decoded, applications can check the encode flag contained in the message header.

C. AIM Message Header

Every application message is pre-fixed with the intelligent messaging network message header prior to being sent to its target destination. The intelligent messaging network utility library provides applications with functions to set/get the contents of the intelligent messaging network message header. It also provides functions to serial out and serial in the contents of the intelligent messaging network message header. Applications are not required to know the internal data representation of the intelligent messaging network message header.

D. AIM Authentication Messages

In order to access the intelligent messaging network via an ISP dialup connection, the intelligent messaging network requires that the user provide security credentials to identify themselves. The intelligent messaging network utility library provides functions to build the intelligent messaging network authentication request message. Applications are not required to know the internal data representation of the intelligent messaging network authentication request message, likewise for the intelligent messaging network authentication response message. Functions are provided to determine the authentication status of the request.

2. Transport Library of the Intelligent Messaging Network

The transport library provides reliable, optimized data communication over various wireless networks, such as the CDPD and Mobitex wireless networks, as well as ISP dialup wire line access to enabled the intelligent messaging network client applications via an easy to use API. The following section summarizes the major functions provided by the mobile client transport library.

Designate Target Destination—The client application can specify the target destination of the machine to receive the message.

Notification of Success/Failure of Transmission—The client application receives notification of the success or failure of the message transmission. For those platforms that support a multi-threaded environment (e.g. WinCE), the notification mechanism is via an event that the transport library asserts. For those platforms that do not support a multi-threaded environment (e.g. Palm OS), the client application is required to continuously poll the transport library to determine if the message transmission was successful or failed.

Message Segmentation—All messages that are greater than the maximum segment size (configurable) are segmented into multiple message segments.

Message Re-Assembly—All multi-segmented messages received are re-assembled into a single message prior to presenting the message to the client application running on client device 112.

Message Retries—All message segments that are not acknowledged by the peer wireless protocol layer within the configured time are retried the configured number of attempts before notifying the client application that the message was delivered (acknowledgment) or not (negative acknowledgment).

Configurable Communication Parameters—The communication parameters for the mobile client transport library can be tailored to the required communication behavior. These values can be configured via the registry (WinX platforms) or the preferences database (Palm OS platforms) prior to opening the mobile client transport library.

Duplicate Message Segment Detection—All duplicate message segments received by the mobile client transport library are acknowledged back to the peer wireless protocol layer, discarded, and conditionally logged.

Duplicate Message Detection—All duplicate messages received by the mobile client transport library are acknowledged back to the peer wireless protocol layer, discarded, and conditionally logged.

A layered architecture can be used for developing the transport library. Under this arrangement, each layer (excluding the bottom) can encompass certain functions, can request services from the layer directly below it, and each layer (excluding the top) can provide services to the layer directly above it. In order for a layer to do the job it is assigned to perform; layer N employs the services of layer N-1. The division of the network into logical layers can allow a higher level to make use of the more primitive functions of lower levels, without having the layer concern itself with the implementation details of those primitives.

A. Protocol Stack

FIG. 3 depicts an exemplary embodiment of a block diagram 300 of the present invention. Block diagram 300 illustrates a proprietary wireless protocol stack of the present invention including a mapping to the layers of the OSI model as illustrated in the left column. Like the TCP/IP protocol stack, the protocol stack of the present invention includes only 5 layers. The highest layer is the applications layer, which corresponds to layer 7 in the OSI protocol stack reference model. Layer 4, the transport layer is the proprietary simple network transport (SNTL) layer of the present invention. Layer 3 is the network layer, corresponding to OSI layer 3. Layers one and two of the OSI model have been combined in the figure for ease of reference and include the data link and physical layers for a variety of supported protocols for specific classes of client devices. Because symmetry is assumed, each of the PGs 116 has a symmetrical protocol stack. Each client device 112 can have only one of the combination layers corresponding to OSI layers one and two. Similarly, while each of the PGs 116 could have one or more of the layers corresponding to the combination OSI layer one and two, an exemplary embodiment can include for each PG 116 having only one combination layer corresponding to layer one and two.

i. Application Layer

The function of application layer (layer 7 of the OSI stack) is to provide an interface between the application and the transport protocol layer by which client applications can send and receive messages across multiple wireless networks (or via dial-up ISP access) without having knowledge of the communication implementation.

In an exemplary embodiment of the present invention, layers 4 can include, e.g., applications such as, e.g, mail, file transfer, and other applications such as, e.g., end user applications.

ii. Transport Layer

This layer logically represents layer 4 of the reference model for the present invention. This layer provides the control structure for managing the communications between two communicating peer transport layers. The following sections detail the functions provided by this protocol layer.

The highest layer is the application layer. Layer 4 is the transport layer and, in an exemplary embodiment, includes a connectionless UDP-like transport protocol that has many of the features and advantages of TCP. That is, the transport layer is connectionless like UDP but has many of the features of TCP including but not limited to message segmentation, message segment reassembly, message retries, and message duplication but has only a four to six byte header.

In an exemplary embodiment of the present invention, layers 4 can include, e.g., the simple network transport layer (SNTL) protocol of the present invention.

iii. Lower Layers

The network layer (layer 3) such as, e.g., the Internet Protocol (IP) layer is responsible for providing network protocol layer functionality and hiding the details of this functionality from the transport layer. Below the network protocol layer is the data link protocol layer (layer 2) and finally the physical protocol layer, which handles modulation and radio transmission.

In an exemplary embodiment of the present invention, layers 1 and 2 can include any of, e.g., the PSTN 308a, CDPD 308b, Mobitex 308c, Ardis 308d, CPRS, and other, and future protocols 308e, and GSM 308f.

Message Segmentation

All messages to be sent over the network that exceed the maximum segment size (configurable) are segmented into multiple message segments. The segment size is configured prior to the client application opening the transport library. The default maximum segment size is 512 bytes.

Segment Header

A transport header is prefixed to every outbound message segment. The transport header is encoded in network-byte order. It is the sole responsibility of the application to encode any application specific data in network-byte order prior to calling the AeTransportSend interface function. The diagram below details the transport header fields.

Figure 9:
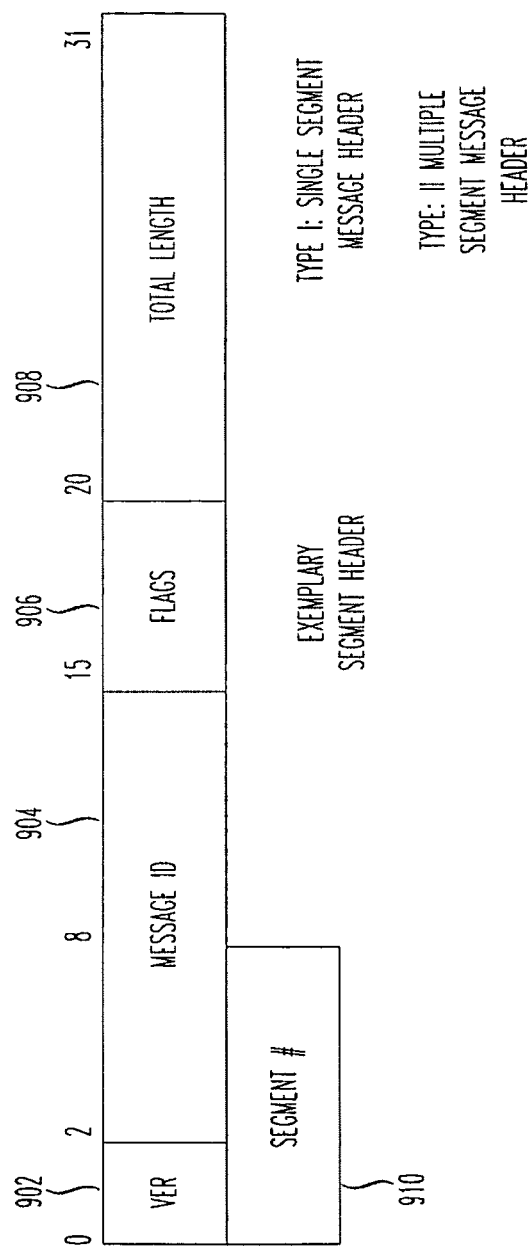
FIG. 9 is an exemplary embodiment of a diagram illustrating an exemplary message header according to the present invention.

FIG. 9 illustrates a diagram 900 illustrating an exemplary embodiment of the present invention. Diagram 900 depicts an exemplary embodiment of an exemplary segment header and exemplary components 902-910 of the header. In an example embodiment, a type I header can include a single segment message header, and a type II header can include a multiple segment message header. It will be apparent to those skilled in the relevant art, that various other header formats can be used within the spirit and scope of the present invention.

⇒ VER 902

This field contains the version number of the Segment Header. It consists of two bits, bit 0 and bit 1 of the $1^{st}$ word in the Segment Header. Valid values are 0 through 3.

⇒ MESSAGE ID 904

This field contains a message identification value. It consists of thirteen bits, bits 2 through 14 of the $1^{st}$ word in the segment header. Valid values are 0 through 8,192. The transport protocol layer uses the message ID to discard segment/message duplications and to match acknowledgments with messages.

⇒ FLAGS 906

This field contains protocol information. It consists of five bits, bits 15 through 19. Valid values are:

Bit 19—segmentation indicator (0 message not segmented, 1—message segmented)

Bit 18—reserved

Bit 17—reserved

Bit 16—message type (0—positive acknowledgment, 1—negative acknowledgment)

Bit 15—message indicator (0—application message, 1—AIM control message)

⇒ TOTAL LENGTH 908

This field contains the total number of bytes contained in the message segment to be sent including the segment header. It consists of twelve bits, bits 20 through 31 of the $2^{nd}$ word in the segment header. Valid values are 4 through 4,096.

⇒ SEGMENT NUMBER 910

This field identifies the number of this message segment. It consists of 8 bits, bits 0 through 7 of the $3^{rd}$ word in the segment header. Valid values are 2 through 255. The peer wireless protocol layer uses this number to re-order the message segments into a single complete message. NOTE: This field is present only if the segmentation indicator is set in the flags field.

Notification of Success/Failure of Transmission

The transport protocol layer retains knowledge of all outstanding message segments pending acknowledgment (message segments that have not been acknowledged by the peer wireless protocol layer) via a pending acknowledgment queue. The pending acknowledgment queue maintains information pertaining to message segments that have been successfully transmitted and are pending acknowledgment from the peer wireless protocol layer. If an acknowledgment (positive or negative) is received for a message segment that is not pending acknowledgment, the ACK is discarded and conditionally logged.

When all message segments have been positively acknowledged by the peer wireless protocol layer, the application is notified (if requested) with a message type of AIM_ACK_MESSAGE and the message ID value associated with the sent message. If the number of transmission attempts for the message segment has exceeded the configured number of retry attempts, the application is notified with a message type of AIM_NACK_MESSAGE, the message ID value associated with the sent message, and the 2 byte error code containing the reason why the message was not delivered. In order to re-send a message that has been negatively acknowledged, the application calls a AeTransportSend interface function.

Message Retries

All message segments not acknowledged by the peer wireless protocol layer within the configured time are automatically re-transmitted. The time to wait for an acknowledgment from the peer wireless protocol layer is configured prior to the client application opening the transport library. The default time to wait for an acknowledgment from the peer wireless protocol layer can for example be 15 seconds.

The transport protocol layer retries the configured number of times before notifying the application that the message could not be delivered (negative acknowledgment). The number of times to retry is configured prior to the client application opening the transport library. The default number of retry attempts is 3.

Message Re-Assembly

All incoming message segments received (including duplicate segments) are immediately acknowledged back to the peer wireless protocol layer and are queued pending receipt of all message segments via the inbound message queues. The incoming message queues manages a separate inbound message queue for each different LinkStationID of the sender.

When all message segments have been received for a message, the segments are assembled into a complete message. If the message ID of the assembled message has been already received (duplicate message), the message is discarded and conditionally logged. This layer keeps track of the last n message IDs received for each unique LinkStationID. The number of message IDs to contain in the message look back queue is configured prior to the client application calling AeTransportOpen to open the transport library. The default number of message IDs to maintain in the message look back queue may be set to 10, for example.

The exemplary message header 900 of FIG. 9 includes segment number field 910 which can be used to identify the segment number of a multi-segment message. For multiple segment messages, an additional field (not shown) can be used to identify the total number of segments in a message. In an exemplary embodiment, the total number of segments field could be 2 bytes wide. Advantageously, according to an exemplary embodiment of the present invention, the simple network transport layer (SNTL) can use the information in the total number of segments field to determine which segments of the total number sent were received as acknowledged, or are required to be retransmitted. The reader is directed to FIGS. 613 and 7B above illustrating transmitting a multi-segment message, and retrying where a segment is not acknowledged.

3. Security Library of the Intelligent Messaging Network

The security library provides encryption and decryption services to the intelligent messaging network enabled applications via an easy to use API. The initial security mechanism is based on Certicon's implementation. The following section summarizes the major functions provided by the security library.

Key Exchanze—Public and private keys are used periodically to establish a common secret key that both the client application running on a client device and server use when exchanging messages. The reason for this is that the overhead of encrypting using public/private keys is much higher than when using a single secret key. The message flows to securely establish a secret key between a client application running on a client device and a server is the responsibility of the security library.

Encryption—Mobile client application running on a client device can optionally encrypt application messages prior to transmitting the message to the target destination. Messages are encrypted with the secret key negotiated between the client application running on a client device and the server. Encryption is always performed after compression.

Decryption—Mobile client applications running on a client device can optionally decrypt client application messages prior to processing the message. To determine if a message needs to be decrypted, client applications can check the encryption flag contained in the message header. Messages are decrypted with the secret key negotiated between the client applications running on a client device and the server. Decryption is always performed before compression.

B. Server Software Development Kit (SDK)

The Intelligent messaging network provides a server SDK environment to assist engineers developing PGs 116 and BESs 122. The server SDK is comprised of an easy to use C++API and a set of Windows NT 4.0 libraries. The SDK can be logically divided into the following two categories of classes:

1. Server classes These are the core classes that server application developers use when creating new PGs 116 and BESs 122. These classes have no Graphical User Interface (GUI); thereby allowing developers to provide their own custom interfaces.

2. Server user interface classes These classes provide a graphical interface to the Server classes. Use of these classes is not required when developing a new Server.

AIM Server Classes

The Server classes are organized in the following simple class hierarchy:

AeServer Class

The AeServer class is the base class for all of the other Server classes and encapsulates those functions that are common to all Servers. These include:

Server Registration/Deregistration—Server subclasses register/de-register from the intelligent messaging network MR database 128 themselves, using methods defined in this class.

Server to Server Connectivity—The logic that determines how two Servers locate and connect to one another is implemented in the AeServer class. The connection flow consists of both establishing a TCP/IP connection as well as the mutual exchange of ServerConnect messages as a means of verifying the identify of each server.

Server to Server Communication—AeServer encapsulates the TCP/IP communication between all Servers. Servers can use the communication functions provided by this class to connect, disconnect, send messages, and receive messages over a TCP/IP connection to other Servers. The AIMSvrPacket is the standard unit of communication between all Servers. The sequence of fields that comprise the AIMSvrPacket is as follows:

AIMSvrPacket Layout

Version (4 bits)—The version number of the AIMSvrPacket.

Header Length (4 bits)—The length of the AIMSvrPacket header in bytes. The AIMSvrPacket header consists of the first 5 fields of the AIMSvrPacket: version, header length, flags, total packet length and source server ID. This length is used by the TCP connection classes to read enough of the packet in order to determine the total size of the remainder of the packet.

Flags (BYTE)—contains protocol information. It consists of eight flag bits, valid values are:

Bit 1—acknowledgment indicator (1—ACK required, 0—ACK not required).

Bit 2—message type indicator (1—server connect message)

Bits 3-8—reserved for future use.

Total Packet Length (unsigned long)—Contains the total number of bytes in the AIMSvrPacket (including the packet header).

Source Server Database ID (unsigned long)—Contains Database ID (a unique value assigned to an Server when the Server registers itself in the intelligent messaging network MR database 128 of the originator of the packet.

LinkStationID (variable length)—Contains the device address of the source or destination of the message contained in the packet. This field's size and content varies depending on the communications type (CDPD, Mobitex, etc) of the device.

Message ID (unsigned short) server packet message identifier.

Customer ID (unsigned long) intelligent messaging network MR database 128 ID of the customer who owns the device targeted by the message in the server packet. Although always present, this field does not always contain a valid value and is set to 0 when not valid. This field is not valid when the AIMSvrPacket contains a network control message (server-to-server messages independent of application messages) or when passing a client message to/from a PG 116 and MR 124. The primary purpose of the field is for MR 124 to BES 122 communications; to identify the message source on incoming messages, and target a specific customer device on outgoing messages.

Port Number (unsigned short) customer device port number. Although always present in the packet, this field only contains a valid (non-zero) value when a BES 122 sends an unsolicited message to a device.

Intelligent Messaging Network Message Header (in an exemplary embodiment can include 6 BYTES)—All application messages prefix the intelligent messaging network message header to the beginning of the application message. The intelligent messaging network message header consists of the following fields:

1. Compression Bits (3-bits)—0=message is not compressed, 1=AIM supplied compression type, 2=Aether supplied compression type, 3=application supplied compression type.
2. Security Bits (3-bits)—0=message is not encrypted, 1=AIM supplied encryption, 2=Aether supplied encryption, 3=application supplied encryption.
3. Version (3-bits) Message header version.
4. Reserved Bits (7-bits) Reserved for future versions.
5. Service Type (12-bits) Identifies which type of service (MarketClip, FX) the message pertains to. This field is used by both indirect and direct routing.
6. Message Type (12-bits) Uniquely identifies the message within the context of the specified service type.
7. Server ID (1-byte)—Identifies a specific BES 122 of the given service type. The value of 0 is reserved to indicate that indirect muting is desired. A non-zero value indicates that the message is targeted at a specific BES 122.

Message Body (variable length) Contains the body of the application message.

AeFEServer Class (for the PGs)

The AeFEServer class subclasses AeServer and encapsulates those functions that are common to all PGs 116. All PGs 116 derived from the AeFEServer class. This class performs the following functions on behalf of all PGs 116:

Encapsulates the Transport Header—Only this class knows the implementation details of the transport header. The transport header contains control information for communicating between the intelligent messaging network enabled client applications and PGs 116.

Asynchronous (non-blocking) Notification of Success/Failure of Transmission—This class optionally notifies the original sender of the message indication of the success or failure of the message transmitted to the client application running on client device 112.

Message Segmentation—All outbound server messages to be sent to the client application that are greater than the maximum segment size (configurable) is segmented into multiple message segments.

Message Re-Assembly—All multi-segmented messages received from the client application are re-assembled into a single message prior to sending the message to a MR 124 to route to a registered BES 122.

Message Retries—All message segments that are not acknowledged by the client device peer wireless protocol layer within the configured time is retried the configured number of attempts before notifying the original sender that the message was delivered (acknowledgment) or not (negative acknowledgment).

Message Pacing—For large multi-segmented messages, many device modems cannot keep up if they are quickly flooded with a series of segments. PGs 116 contain a configurable setting that can be set to slow up the transmission of messages larger than a specified number of segments.

Duplicate Message Segment Detection—All duplicate message segments received from the client device are acknowledged back to the client device peer wireless protocol layer, discarded, and conditionally logged.

Duplicate Message Detection—All duplicate messages received from the client device is acknowledged back to the client device peer wireless protocol layer, discarded, and conditionally logged.

Configurable Communication Preferences—The communication parameters for the PG 116 can be configured to tailor the communication behavior. These values are configured prior to the starting the PG 116.

AeBEServer Class

The AeBEServer class subclasses from AeServer and encapsulates those functions that are common to all BESs 122. This class performs the following functions on behalf of all BESs 122:

Generate ACK Control Messages—When this class receives an incoming from a PG 116 routed via MR 124, it creates an ACK control message and send it back to the originating PG 116 via a MR 124. When the PG 116 receives this ACK control message, it sends a transport layer ACK message to the client application on a client device that originated the message indicating that the message was delivered to the BES 122.

Process ACK Control Messages—When this class receives an ACK control message from a PG 116, indicating that the server application message was delivered to the client device, it notifies the derived BES 122.

Message Compression/Decompression—AeBEServer is responsible for compressing any outgoing messages and decompressing incoming messages. If an AIM provided compression type is involved, compression/decompression is done transparently relative to any subclasses of this type. Alternately, AeBEServer subclasses may implement compression in their message serialization.

Message Encryption/Decryption—AeBEServer is responsible for encrypting any outgoing messages and decrypting incoming messages. If an AIM provided encryption type is involved, encryption/decryption is done transparently relative to any subclasses of this type. Alternately, AeBEServer subclasses may implement their own encryption algorithms by implementing the appropriate virtual methods that is invoked by AeBEServer at the appropriate times.

Derived PGs 116

All the intelligent messaging network developed PGs 116 are derived from the AeFEServer class. Derived PGs 116 provide the following functions:

Encapsulate the Communication Layer—Derived PGs 116 provide the network specific interface to the communication layer used by the PG 116. The parent class (AeFEServer) does not know the implementation details of the underlying protocol layer used to send and receive messages to and from client applications running on client devices 112. This is the sole responsibility of the derived PG 116.

Derived BESs 122

All BESs 122, developed by the intelligent messaging network can be derived from either the AeBEServer. Derived BESs 122 provide the following functions:

Process application Specific Messages—All application specific knowledge is implemented in the derived BES 122. For example, a news service can provide client devices with news stories related to a specific financial entity. The derived news server's parent class hierarchy (AeBEServer and AeServer) does not know the implementation details of the application message protocol. This is the sole responsibility of the derived BES 122.

Special Compression Services—If a BES 122 has specific compression requirements for their application data that is not addressed by the Intelligent messaging network supplied compression, the BES 122 is responsible for providing the compression mechanism.

Special Security Services—If a BES 122 has specific encryption requirements for their application data that is not addressed by the Intelligent messaging network supplied encryption, the derived BES 122 is responsible for providing the encryption mechanism.

Server User Interface Classes

The server user interface class hierarchy parallels the Server class hierarchy and provides the following types of functionality:

1. Persistent storage of configurable server settings as well as a common user interface for viewing/editing those settings.
2. Screen based error logging.
3. NT Event Log error logging and automatic batch file error notification.
4. Inbound/outbound message logging.
5. Inbound/outbound message statistics.

AeServerApp

AeServerApp is the base class for all of the other Server GUI apps. All Server applications are complete, windows-based, executable programs. AeServerApp expects its subclasses to provide it with an instance of an AeServer subclass. Of the five areas of functionality listed above, AeServerApp provides the following:

1. Persistent storage of configurable server settings and common user interface framework for viewing/editing those settings. —Persistent storage is implement through the Windows registry and AeServerApp provides the base registry key for all of its subclasses to use. AeServerApp also provides a standard method of viewing/editing server settings in the form of a PropertySheet. Subclasses provide for their own individual server settings by adding PropertyPages to the base class PropertySheet. AeServerApp provides a common page for handling server settings common to all server types.
2. Screen based error logging. —In addition to providing a window where system events and errors can be displayed, AeServerApp also supplies a separate logging thread that can be used by subclasses when displaying output to their own windows. This thread runs at lower priority then the server processing threads so that screen logging does not negatively impact performance.
3. NT Event Log error logging and automatic batch file error notification. —AeServerApp provides a mechanism whereby system errors can be written to the NT Event log. The level of error reporting is configurable. In addition to the NT Event log, users may specify that a batch file be executed when an error of a specified severity occurs. Such batch files could be used to communicate problems to a system administrator via email or a pager.

AeFEServerApp

AeFEServerApp is derived from AeServerApp and provides the following additional user interface features:

1. PG specific server settings—Provides a user interface and persistent storage for transport settings such as maximum number of retries, retry timeout interval, segment size, etc.

2. Inbound/Outbound message logging—Provides two windows that log each inbound and outbound message. Makes use of the AeServerApp logging thread. Logging may be enabled/disabled for either window.
3. PG specific statistics—Gathers and displays statistical totals such as number of messages sent/received, number of ACKS/NACKS sent/received.

AeBEServerApp and CBEServerSampleApp

These classes provide a standard GUI for BESs 122. Both are derived from AeServerApp and both provide the same set of user interface features. CBEServerSampleApp came first and was actually written before there was an AeServerApp (although the current version derives from AeServerApp). The difference between the two classes is that CBEServerSampleApp also derives from AeBEServer, while AeBEServerApp has a AeBEServerApp member (inheritance vs aggregation). Other than that the two classes provide the same set of features:

1. Inbound/Outbound message logging—Provides two windows that log each inbound and outbound message. Makes use of the AeServerApp logging thread. Logging may be enabled/disabled for either window.
2. Back-End specific statistics—Gathers and displays statistical totals such as number of messages sent/received, number of ACKS/NACKS sent/received, and compressed vs. uncompressed byte totals.
3. Application message log view—Provides an additional logging window that applications should use to log their own errors or trace statements rather than intermingling them with the system messages in the system log window.

C. Wizards and Resource Kit of the Intelligent Messaging Network

In a well-known manner, intelligent messaging network can also provide tools that work in conjunction with the Microsoft Visual Developer Studio framework. These tools assist engineers developing client and BES 122 applications, as well as stress test and monitor the health of the intelligent messaging network.

1. Message Builder Wizard

The Intelligent messaging network Message Wizard makes it easy for developers to define their application specific data content of the intelligent messaging network messages. The wizard makes it easier for the developer to focus on adding business value to their application instead of having to worry about the tedious and error prone task of writing the serialization code to transfer message content between server and client. It also automatically generates the code needed to serialize the message content between a client application and a BES 122 application.

2. Back End Server App Wizard

The BES 122 App Wizard can make it easy for developers to create BES 122 applications. The BES 122 App Wizard generates the Visual Studio C++ project and its associated program and header files to create a BES 122 executable. BES 122 developers would then need to add program logic to support their application protocol.

3. Ping App Wizard

In order to assist engineers developing a BES 122 Ping application, the intelligent Et messaging network Ping App Wizard makes it easy for developers to create a Ping BES 122 executable. The Ping App Wizard generates the Visual Studio C++ project and its associated program and header files to send an application defined "heart beat" message to a BES 122. BES 122 developers may want to use this tool as a way to monitor the health of their BES 122.

VIII. NT client Simulation Application

In order to assist engineers developing BES 122s, the intelligent messaging network can also provide a client simulation application. Developers can use the client simulation application to simulate multiple clients and to generate BES 122 specific message traffic. The client simulation application supports the following major functions:

Simulate up to 256 clients
Support multiple communication networks
    CDPD
    Mobitex
    Dial-Up
    TCP/IP LAN
Configurable simulation attributes
    Number of messages to send
    Application defined messages
    Relative send frequencies for each message type
    Compression
Capture/present performance statistics
    Total messages sent
    Average message response time From the forgoing description it may be appreciated that the present invention provides protection against technology obsolescence by supporting seamless integration of information sources with multiple wireless networks and client devices. As such, the invention provides a reliable method of data transfer, while optimizing bandwidth constraint of wireless data services and providing end-to-end security. This invention allows for system growth by incorporating the new devices and wireless network technologies as they become available, without the need to modify client and server applications.

The above-described environment, which has a messaging base architecture, serves as the framework for implementation of the invention. This environment can provide client/server connectivity, which can provide an enabling mechanism for application network connection connectivity. The architecture can support messaging. Platform transparency can be provided enabling platform independence of client devices 112. Network transparency can be provided by an enabling mechanism for network independence by hiding the underlining network protocol. The SDK can provide an easy to use developers tool kit and environment for the design development of each aspect of the application, the client device 112, and server.

While various exemplary embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents.

What is claimed is:

1. A method of deploying content to client applications, comprising:
    accepting an inbound message from a client application running on a client device via a proxy IP/port;
    packaging the inbound message into an internal message format with an HTTP redirector;
    forwarding the packaged inbound message to a back-end server;
    receiving a response from a web server;
    packaging the response into the internal message format with the back end server;
    forwarding the response to the HTTP redirector; and
    transferring the response to the client application running on the client device via the proxy IP/port.

2. Apparatus for deploying content to client applications, comprising:
- means for accepting an inbound message from a client application running on a client device via a proxy IP/port;
- means for packaging the inbound message into an internal message format with an HTTP redirector;
- means for forwarding the packaged inbound message to a back-end server;
- means for receiving a response from a web server;
- means for packaging the response into the internal message format with the back end server;
- means for forwarding the response to the HTTP redirector; and
- means for transferring the response to the client application running on the client device via the proxy IP/port.

3. A method of accessing a back-end server, comprising:
- intercepting, via a proxy port, a mobile client web browser HyperText Transfer Protocol (HTTP) request from a physical mobile client device;
- packaging, with a physical HTTP re-director, said mobile client web browser HTTP request;
- transmitting, via a non-Internet Protocol(IP) protocol, said packaged mobile client web browser HTTP request to a physical back-end server;
- receiving a response message from said physical back-end server; and
- accessing a transport library, independent of a peer wireless protocol, to obtain a message relating to said mobile client web browser request.

4. The method of accessing a back-end server according to claim 3, wherein:
said proxy port is an Internet Protocol(IP) proxy port.

5. The method of accessing a back-end server according to claim 3, wherein:
said non-IP protocol supports message segmentation.

6. The method of accessing a back-end server according to claim 3, wherein:
said non-IP protocol supports message segmentation reassembly.

7. The method of accessing a back-end server according to claim 3, wherein:
said non-IP protocol supports message retries.

8. The method of accessing a back-end server according to claim 3, wherein:
said non-IP protocol supports message duplication.

9. The method of accessing a back-end server according to claim 3, wherein:
said obtained message relates to successful transmission.

10. The method of accessing a back-end server according to claim 3, wherein:
said obtained message relates to message segmentation.

11. The method of accessing a back-end server according to claim 3, wherein:
said obtained message relates to message retry.

12. The method of accessing a back-end server according to claim 3, wherein:
said obtained message relates to duplicate message.

13. The method of accessing a back-end server according to claim 3, further comprising:
accessing, from said physical mobile client device, said transport library to obtain information related to a wireless protocol supported by said physical mobile client device.

14. The method of accessing a back-end server according to claim 3, wherein:
said physical HTTP re-director provides a client side proxy.

15. The method of accessing a back-end server according to claim 3, wherein:
said physical HTTP re-director provides compression of said mobile client web browser HTTP request.

16. The method of accessing a back-end server according to claim 3, wherein:
said physical HTTP re-director provides decompression of said response message to said mobile client web browser HTTP request.

17. The method of accessing a back-end server according to claim 3, wherein:
said physical HTTP re-director unpacks said response message to said mobile client web browser HTTP request.

* * * * *